United States Patent
Ho et al.

(10) Patent No.: US 11,459,061 B2
(45) Date of Patent: Oct. 4, 2022

(54) BICYCLE COMPONENT MOTION CONTROL

(71) Applicant: SRAM, LLC, Chicago, IL (US)

(72) Inventors: Alexander Kon-I Ho, Chicago, IL (US); Sage Hahn, Chicago, IL (US); Sang Kim, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 610 days.

(21) Appl. No.: 16/522,002

(22) Filed: Jul. 25, 2019

(65) Prior Publication Data

US 2020/0223513 A1    Jul. 16, 2020

Related U.S. Application Data

(60) Provisional application No. 62/791,781, filed on Jan. 12, 2019.

(51) Int. Cl.
| | |
|---|---|
| *B62M 9/122* | (2010.01) |
| *B62M 25/04* | (2006.01) |
| *B62M 25/08* | (2006.01) |
| *H01H 9/06* | (2006.01) |
| *B62J 45/40* | (2020.01) |

(52) U.S. Cl.
CPC ............ *B62M 9/122* (2013.01); *B62M 25/04* (2013.01); *B62M 25/08* (2013.01); *H01H 9/06* (2013.01); *B62J 45/40* (2020.02); *H01H 2009/068* (2013.01)

(58) Field of Classification Search
CPC ........ B62M 25/08; B62M 6/45; B62M 9/122; B62M 9/132; B60L 2240/545; B60L 3/0046; B60L 58/12; B60L 2200/12

USPC .............................................. 474/70, 80, 82
See application file for complete search history.

(56) References Cited

U.S. PATENT DOCUMENTS

| | | | | |
|---|---|---|---|---|
| 5,798,702 A | * | 8/1998 | Okamoto | G01R 31/3842 340/432 |
| 7,292,006 B2 | * | 11/2007 | Horiuchi | B60L 58/14 290/1 R |
| 7,311,322 B2 | * | 12/2007 | Kitamura | B62M 25/08 474/69 |

(Continued)

FOREIGN PATENT DOCUMENTS

| | | |
|---|---|---|
| CN | 1689905 A | 11/2005 |
| CN | 1833945 A | 9/2006 |

(Continued)

*Primary Examiner* — Henry Y Liu

(57) ABSTRACT

Bicycle component motion control begins when a motorized bicycle component is commanded to shift or actuate. The bicycle component motion control compares parameters of a component of the bicycle to be moved, to predetermined thresholds to provide safe shifting or actuation. The shift or actuation starts only when the battery voltage and the battery temperature are within predetermined acceptable ranges, respectively. Once the shift or actuation has started, the shift or actuation is aborted if the battery voltage remains below a predetermined low voltage threshold for a predetermined amount of time. If the shift or actuation is aborted when the component is in a position, in which the bicycle may not operate at a particular level or is inoperable, the shift or actuation command is modified to move the component to a previous position or an intermediate position.

20 Claims, 11 Drawing Sheets

(56) References Cited

U.S. PATENT DOCUMENTS

| | | | | |
|---|---|---|---|---|
| 7,342,321 B2* | 3/2008 | Kitamura | ............... | B62M 25/08 |
| | | | | 290/1 R |
| 7,399,244 B2* | 7/2008 | Takebayashi | .......... | B62M 9/122 |
| | | | | 474/70 |
| 7,553,247 B2* | 6/2009 | Guderzo | ................ | B62M 9/122 |
| | | | | 474/70 |
| 9,223,302 B2* | 12/2015 | Maurer | ................. | G05B 15/02 |
| 9,260,035 B2* | 2/2016 | Chun | ...................... | B62M 6/45 |
| 9,688,159 B2* | 6/2017 | Fultz | ....................... | B60L 58/21 |
| 2003/0107347 A1* | 6/2003 | Yoshizawa | ........... | H02J 7/045 |
| | | | | 320/161 |
| 2004/0084238 A1* | 5/2004 | Yokotani | ............. | B60L 58/14 |
| | | | | 180/206.2 |
| 2004/0195025 A1* | 10/2004 | Kitamura | ................ | B62M 6/90 |
| | | | | 180/207.1 |
| 2010/0010709 A1* | 1/2010 | Song | ..................... | B62M 25/08 |
| | | | | 701/37 |
| 2010/0121513 A1* | 5/2010 | Itoh | ........................ | B60L 58/27 |
| | | | | 180/65.265 |
| 2010/0185405 A1* | 7/2010 | Aoshima | ............... | B60L 50/64 |
| | | | | 702/63 |
| 2012/0013189 A1* | 1/2012 | Jenkins | .............. | H02J 7/00304 |
| | | | | 307/80 |
| 2014/0087901 A1* | 3/2014 | Shipman | ............... | B62M 9/122 |
| | | | | 429/100 |
| 2015/0111675 A1* | 4/2015 | Shipman | ............... | B62M 25/08 |
| | | | | 474/82 |
| 2015/0191162 A1* | 7/2015 | Dao | ........................ | H04Q 9/00 |
| | | | | 701/22 |
| 2016/0089994 A1* | 3/2016 | Keller | ............... | H02J 7/007182 |
| | | | | 320/153 |
| 2016/0200216 A1* | 7/2016 | Fultz | ...................... | B60L 58/21 |
| | | | | 320/136 |
| 2016/0280330 A1* | 9/2016 | Hara | .................... | B62K 25/286 |
| 2016/0311500 A1* | 10/2016 | Kasai | ...................... | B62J 43/30 |
| 2018/0001960 A1* | 1/2018 | Pasqua | .................. | B62M 9/132 |
| 2018/0266637 A1* | 9/2018 | Curlett | ................ | H01M 50/121 |
| 2018/0364786 A1* | 12/2018 | de la Cropte de Chanterac | ......... | |
| | | | | G06F 1/329 |
| 2018/0375176 A1* | 12/2018 | Sakabe | .................. | H02J 7/007 |
| 2019/0009849 A1* | 1/2019 | Komatsu | .................. | B62M 50/22 |
| 2019/0265302 A1* | 8/2019 | Wang | .................. | H01M 10/486 |

FOREIGN PATENT DOCUMENTS

| | | |
|---|---|---|
| CN | 101068096 A | 11/2007 |
| CN | 102991640 A | 3/2013 |
| CN | 103693155 A | 4/2014 |
| EP | 1702837 A1 | 9/2006 |
| EP | 1724901 A1 | 11/2006 |
| EP | 3363726 A1 | 8/2018 |
| JP | 10-181671 A | 7/1998 |
| TW | 349514 U | 1/1999 |
| TW | 200514727 A | 5/2005 |
| TW | 200642232 A | 12/2006 |

* cited by examiner

BICYCLE COMPONENT MOTION CONTROL

FIELD OF THE DISCLOSURE

The present disclosure is generally directed to motorized components for bicycles and, more particularly, to control of a rear derailleur or a bicycle.

INTRODUCTION

Components on a bicycle may be motorized. For example, a rear derailleur of a bicycle may be motorized and may be powered by, for example, a battery. Batteries such as, for example, lithium ion batteries may be used within a large temperature range (e.g., negative twenty degrees Celsius to 60 degrees Celsius). Use of a lithium ion battery, for example, below the temperature range may result in poor performance (e.g., a reduction of battery capacity) of the lithium ion battery and permanent damage to the lithium ion battery. For example, use of the lithium ion battery below the temperature range may result in lithium plating and a short circuit within the lithium ion battery, resulting in thermal runaway and failure of the lithium ion battery.

SUMMARY

In one example, a motorized component for a bicycle includes a power source configured to generate current for a motor. The motor is configured to move a movable part of the motorized component. The motorized component also includes a first sensor configured to measure a first value. The first value represents a first parameter associated with the power source. The motorized component includes a second sensor configured to measure a second value. The second value represents a second parameter associated with the power source. The motorized component also includes a processor in communication with the first sensor and the second sensor. The processor is configured to receive a request to move the movable part of the motorized component, identify a predetermined threshold, and compare a combination of the measured first value and the measured second value to the identified predetermined threshold. The predetermined threshold is a range of values for a combination of the first parameter and the second parameter. Based on the comparison, when the combination of the measured first value and the measured second value achieves the predetermined threshold, the processor is further configured to control the current from the power source to the motor based on the received request, such that the movable part of the motorized component moves.

In one example, the processor is further configured to, based on the comparison, abort the requested movement when the combination of the measured first value and the measured second value does not achieve the predetermined threshold.

In one example, the processor is further configured to communicate the abortion of the requested movement to a user of the bicycle.

In one example, the processor is further configured to identify operational characterization data for the bicycle. The identification of the predetermined threshold comprises identification of the predetermined threshold based on the identified operational characterization data for the bicycle.

In one example, the operational characterization data for the bicycle data includes data related to a type of the bicycle, a position of the movable part of the motorized component, a property of the power source, a property of the motor, a property of electronics of the motorized component, or any combination thereof.

In one example, the motorized component further includes a memory in communication with the processor. The memory is configured to store a plurality of datasets or a plurality of functions. Each dataset of the plurality of datasets or each function of the plurality of functions represents a respective predetermined threshold range of values for the combination of the first parameter and the second parameter. The identification of the predetermined threshold includes selection of a dataset of the plurality of datasets or a function of the plurality of functions based on the identified operational characterization data for the bicycle. The selected dataset or function represents the identified predetermined threshold.

In one example, the first parameter is a temperature of the power source, and the second parameter is a voltage of the power source.

In one example, the power source is a battery.

In one example, the motorized component is a derailleur.

In one example, the received request to move the movable part of the derailleur includes a plurality of movements. The first sensor is configured to measure the first value before each movement of at least a subset of movements of the plurality of movements, and the second sensor is configured to measure the second value before each movement of at least the subset of movements. Before each movement of at least the subset of movements, the processor is further configured to compare a combination of the respective measured first value and the respective measured second value to the identified predetermined threshold or another predetermined threshold. The other predetermined threshold is another range of values. Based on the comparison, the processor is further configured to abort the requested movement when the combination of the respective measured first value and the respective measured second value does not achieve the predetermined threshold or the other predetermined threshold In one example, the received request to move the movable part is a request to move the movable part from a first position to a second position. When the requested movement is aborted, the processor is further configured to move the movable part, via the power source and the motor, back to the first position or to a third position between the first position and the second position.

In one example, the subset of movements is the plurality of movements.

In one example, the processor is further configured to identify a predetermined voltage minimum and a predetermined low voltage time limit. Before each movement of at least the subset of movements, the processor is further configured to compare the respective measured second value to the identified predetermined voltage minimum. Before each movement of at least the subset of movements, the processor is further configured to, based on the comparison, when the respective measured second value is less than the identified predetermined voltage minimum, identify whether a timer is running, when the timer is identified as not running, start the timer, and when the timer is identified as running, compare a time of the timer to the identified predetermined low voltage time limit. When the timer is identified as running, the processor is further configured to, based on the comparison, abort the requested movement when the time of the timer is greater than the identified predetermined low voltage time limit. The processor is further configured to, based on the comparison, when the respective measured second value is greater than the identified predetermined voltage minimum, reset the timer when the timer is running.

In one example, the plurality of movements are a plurality of gear shifts of the derailleur, respectively.

In one example, a rear derailleur for a bicycle includes a motor configured to move a movable part of the rear derailleur, a battery configured to power the motor, a first sensor configured to measure a temperature associated with the battery, and a second sensor configured to measure a voltage of the battery. The rear derailleur also includes a processor in communication with the first sensor and the second sensor. The processor is configured to compare a combination of the measured temperature and the measured voltage to a predetermined threshold. The predetermined threshold is a range of values. The processor is further configured to, based on the comparison, when the combination of the measured temperature and the measured voltage achieves the predetermined threshold, move the movable part of the rear derailleur with the motor and the battery.

In one example, the processor is further configured to receive a request to move the movable part of the rear derailleur. The movement of the movable part of the rear derailleur is based on the received request.

In one example, the processor is further configured to identify operational characterization data for the bicycle, and identify the predetermined threshold range of values for the combination of the first parameter and the second parameter based on the identified operational characterization data for the bicycle.

In one example, the processor is further configured to, based on the comparison, abort the requested movement when the combination of the measured temperature and the measured voltage does not achieve the predetermined threshold.

In one example, the processor is further configured to communicate the abortion of the requested movement to a user of the bicycle.

In one example, a method for controlling motion of a movable part of a motorized component of a bicycle. The bicycle includes a power source and a motor. The power source is configured to power the motor. The method includes measuring, by a first sensor, a first value. The first value represents a first parameter associated with the power source. The method also includes measuring, by a second sensor, a second value. The second value represents a second parameter associated with the power source. The method includes receiving, by a processor in communication with the first sensor and the second sensor, a request to move the movable part of the motorized component, identifying a predetermined threshold, and comparing a combination of the measured first value and the measured second value to the identified predetermined threshold range of values. The predetermined threshold is a range of values for a combination of the first parameter and the second parameter. The method also includes moving, by the motor, based on the comparison, the movable part when the combination of the measured first value and the measured second value achieves the predetermined threshold range of values.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

Bicycle component motion control begins when a user commands a derailleur or other motorized bicycle component to shift or actuate, or when the shift or actuation is activated automatically by a control algorithm being executed by the bicycle. The disclosed motorized component motion control solves or improves upon the above-noted and/or other problems and disadvantages with existing and prior known motorized bicycle components. The bicycle component motion control of one or more of the present embodiments compares a combination of values for parameters of a component of the bicycle to a predetermined threshold. The parameters to be checked include, for example, battery voltage and battery temperature for a battery to be used for the shifting or actuation. The shift or actuation starts only when the battery voltage and the battery temperature are within predetermined acceptable ranges, respectively. Once the shift or actuation has started, the shift or actuation is aborted if the battery voltage remains below a predetermined low voltage threshold for a predetermined amount of time. If the shift or actuation is aborted, the user is notified with, for example, an audio or a visual signal. If the shift or actuation is aborted when the component is in a position, in which the bicycle may not operate at a particular level or is inoperable, the shift or actuation command is modified to move the component to a previous position or an intermediate position.

The comparison of battery parameter values to the predetermined threshold before allowing a shift or actuation provides for safe shifting and/or actuation of a rear derailleur or another motorized component powered by the battery. This extends the life of the battery and prevents failure of the battery related to cold discharge of the battery.

Figure 1:
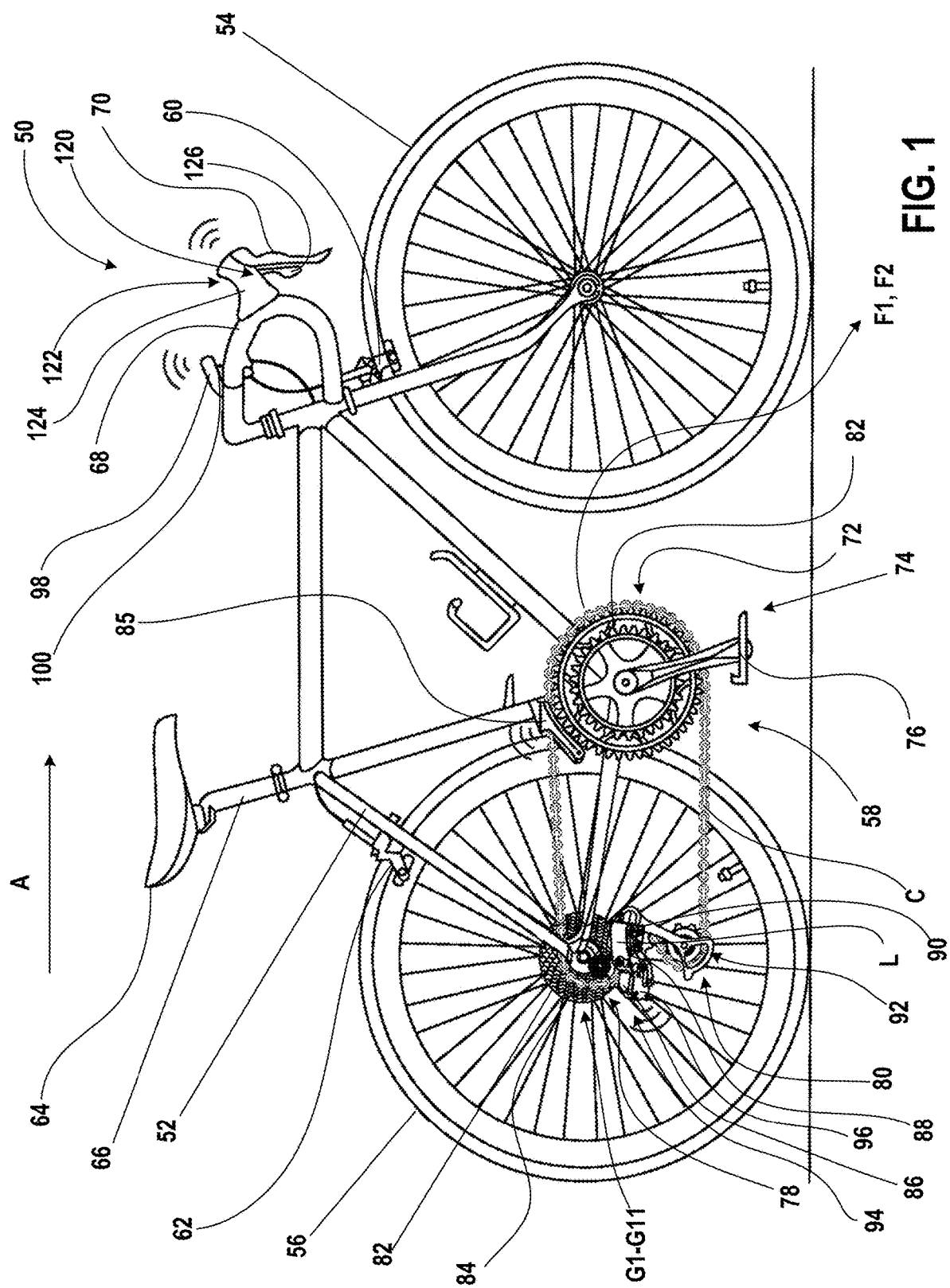
FIG. 1 shows a side view of one example of a bicycle with component motion that may be controlled in accordance with the teachings of this disclosure.
Figure 2:
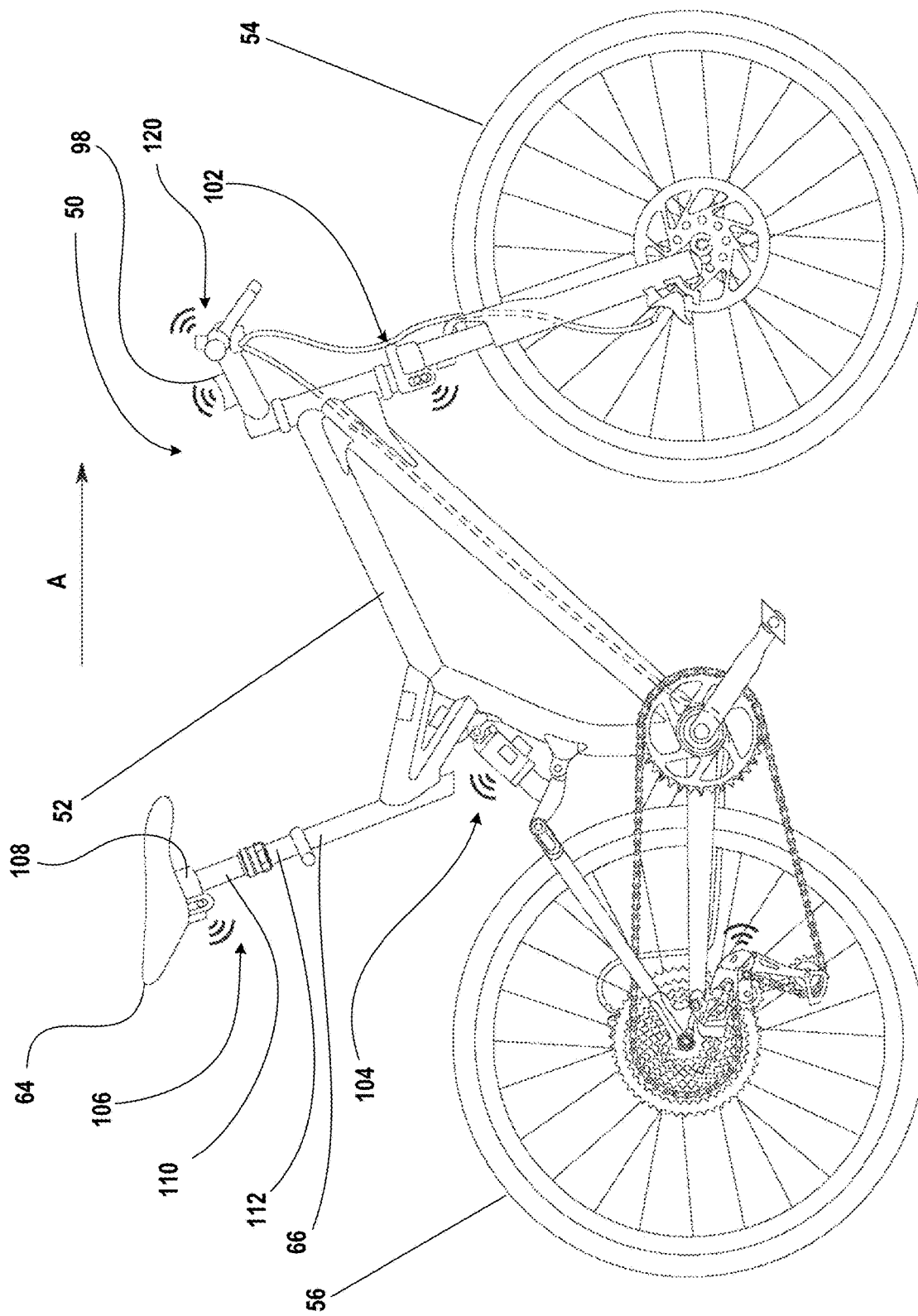
FIG. 2 shows a side view of another example of a bicycle with component motion that may be controlled in accordance with the teachings of this disclosure.

Turning now to the drawings, FIGS. 1 and 2 illustrate respective examples of human powered vehicles 50 for which the disclosed component motion control may be implemented with a wireless control system or a wired control system. In FIG. 1, the human powered vehicle 50 is a first type of bicycle, such as a road bicycle. In FIG. 2, the human powered vehicle 50 is a second type of bicycle, such as a mountain bicycle. While the bicycles 50 depicted in FIGS. 1 and 2 are a road bicycle (e.g., with mechanical (cable, hydraulic, and/or pneumatic) or non-mechanical (wired and/or wireless) drive systems) and a mountain bicycle (e.g., with full or partial suspensions), respectively, the component motion control, including the specific embodiments and examples disclosed herein as well as alternative embodiments and examples, may be implemented on other types of vehicles or bicycles. For example, the disclosed component motion control may be used on other types of two-, three-, and four-wheeled human powered vehicles as well.

Referring to FIG. 1, the bicycles 50 employ a control device and a method for controlling one or more components of the bicycle 50 in accordance with the teachings of the present disclosure. The bicycle 50 includes a frame 52, a front wheel 54 and a rear wheel 56 each rotatably attached to the frame 52, and a drivetrain 58. A front brake 60 is provided for braking the front wheel 54, and a rear brake 62 is provided for braking the rear wheel 56. The bicycle 50 also generally has a seat 64 near a rear end of the frame 52 and carried on an end of a seat tube 66 connected to the frame 52. The bicycle 50 also has handlebars 68 near a forward end of the frame 52. The handlebars 68 are attached to the frame 52 for user, or rider, control of the bicycle 50. A brake lever 70 is carried on the handlebars 68 for actuating one of the front brake 60 or rear brake 62, or both. If the brake lever 70 actuates only the front brake 60 or the rear brake 62, a second brake lever (not shown) may also be provided to actuate the other brake. A front and/or forward riding direction or orientation of the bicycle 50 is indicated by the direction of the arrow A in FIG. 1. As such, a forward direction for the bicycle 50 is indicated by the direction of arrow A.

The drivetrain 58 has a chain C and a front sprocket assembly 72, which is coaxially mounted with a crank assembly 74 having pedals 76. The drivetrain 58 also includes a rear sprocket assembly 78 coaxially mounted with the rear wheel 56 and a rear gear change mechanism, such as a rear derailleur 80.

As is illustrated in FIG. 1, the front sprocket assembly 72 may include one or more coaxially mounted chain rings, gears, or sprockets. In the example of FIG. 1, the front sprocket assembly 72 has two such sprockets, F1 and F2, each having teeth 82 around a respective circumference. In the example of FIG. 2, the front sprocket assembly 72 has one such sprocket F1, having teeth 82 around a circumference of the sprocket F1. As shown in FIGS. 1 and 2, the rear sprocket assembly 78 may include a plurality (e.g., eleven and nine in FIGS. 1 and 2, respectively) of coaxially mounted gears, cogs, or sprockets G1-GN. Each sprocket G1-GN also has teeth 84 arranged around a respective circumference. Referring to FIG. 1, the number of teeth 82 on the smaller diameter front sprocket F2 may be less than the number of teeth 82 on the larger diameter front sprocket F1. The number of teeth 84 on the rear sprockets G1-GN may gradually decrease from the largest diameter rear sprocket G1 to the smallest diameter sprocket GN. As shown in FIG. 1, a front gear changer 85 may be operated to move from a first operating position to a second operating position to move the chain C between the front sprockets F1 and F2. Likewise, the rear derailleur 80 may be operable to move between a number of different operating positions (e.g., nine or eleven operation positions) to switch the chain C to a selected one of the rear sprockets G1-GN. In an embodiment, the rear sprocket assembly 78 may have more or fewer sprockets. For example, in an embodiment, a rear sprocket assembly may have twelve or thirteen sprockets. Dimensions and configuration of the rear derailleur 80 may be modified to accommodate a specific implemented plurality of sprockets. For example, an angle and length of the linkage and/or the configuration of the cage of the derailleur may be modified to accommodate specific sprocket combinations.

The rear derailleur 80 is depicted in these examples as a wireless, electrically actuated rear derailleur mounted or mountable to the frame 52, or frame attachment, of the bicycle 50. The electric rear derailleur 80 has a base member 86 (e.g., a b-knuckle) that is mounted to the bicycle frame 52. A linkage 88 has two links L that are pivotally connected to the base member 86 at a base member linkage connection portion. A movable member 90 (e.g., a p-knuckle) is connected to the linkage 88. A chain guide assembly 92 (e.g., a cage) is configured to engage and maintain tension in the chain and is pivotally connected to a part of the movable member 90. The cage 92 may rotate or pivot about a cage rotation axis in a damping direction and a chain tensioning direction.

A motor module 94 is carried on the electric rear derailleur 80 and has a battery 96. The battery 96 supplies power to the motor module 94. In one example, the motor module 94 is located in the movable member 90. However, the motor module 94 may instead be located elsewhere, such as in one of the links L of the linkage 88 or in the base member 86. The motor module 94 may include a gear mechanism or transmission. As is known in the art, the motor module 94 and gear mechanism may be coupled with the linkage 88 to laterally move the cage 92 and thus switch the chain C among the rear sprockets on the rear sprocket assembly 78.

The battery 96 may instead be an alternate power supply or power source and may operate other electric components of the bicycle 50 within a linked system. In one example, the battery 96 alone powers all electric components of the bicycle 50 (e.g., a drive motor for an electrically powered bicycle), including the rear derailleur 80. In other examples, multiple power supplies, which may collectively or individually power the electric components of the system, including the rear derailleur 80, may be provided. Additional batteries or other power supplies may be attached to the rear derailleur 80 or located at other positions, such as the frame 52. In this example, however, the battery 96 is configured to be attached directly to the rear derailleur 80, and to provide power to the components of the rear derailleur 80. In an embodiment, the rear derailleur is configured such that the battery 96 provides power to only the components of the rear derailleur 80.

As shown in the examples of FIGS. 1 and 2, a control device 98 is mounted to the handlebars 68 for wirelessly actuating the motor module 94 and operating the rear derailleur 80 for executing gear changes and gear selection. As shown in the example of FIG. 1, the control device 98 is mounted to the handlebars 68 with a control device coupler 100. Multiple control devices 98 may be used with the bicycle 50. The control device 98 is configured to actuate or otherwise control components of the bicycle 50. For example, the control device 98 may be configured to control gear shifting of the front gear changer 85 and/or the rear derailleur 80.

Referring to FIG. 2, the control device 98 may also be configured to control characteristics of a suspension system (e.g., front suspension 102 and/or rear suspension 104). The front suspension 102 movably mounts the front wheel 54 to the frame 52, and the rear suspension 104 movably mounts the rear wheel 56 to the frame 52. The front suspension 102 and the rear suspension 104 may include one or more adjustable suspension components such as, for example, a spring or damper. The control device may be configured to adjust the one or more adjustable suspension components.

The control device 98 may also be configured to control characteristics of a seat post assembly 106. The seat post assembly 106 movably attaches the seat 64 to the frame 52. The seat post assembly 106 may include a seat post head 108 attachable to the seat 64 (e.g., a saddle) and connected to a seat post upper tube 110. The seat post upper tube 110, the seat post head 108, and the saddle 64 may be configured to move relative to a seat post lower tube 112 fixably attached to the frame 52. For example, the seat post upper tube 110 may ride within the seat post lower tube 112, where the seat post lower tube 112 is fixed to the seat tube 66 of the frame 52. In one example, the control device 98 is configured to control a motor within the seat post assembly 106 to adjust a height of the seat 64 relative to the frame 52.

In other embodiments, the control device 98 may be located in other locations on the bicycle 50 or, alternatively, may be distributed among various components of the bicycle 50, with routing of a communication link to accommodate necessary signal and power paths. The control device 98 may also be located in places other than on the bicycle 50, such as, for example, on a rider's wrist or in a jersey pocket. The communication link may include wires, may be wireless, or may be a combination thereof. In one example, the control device 98 may be integrated with the rear derailleur 80 to communicate control commands between components. The control device 98 may include a processor, a communication device (e.g. a wireless communication device), a memory, and one or more communication interfaces.

The handlebars 68 of FIG. 1 illustrates a drop bar assembly, and FIG. 2 illustrates an aero-bar configuration; however, the control device 98 may be used with other types of handlebar assemblies as well, such as bullhorn bars, riser bars, or any other type of bicycle handlebar. Also, while the embodiments described herein describe control devices attached to handlebars, a person having experience in the art would recognize the possible positioning of control devices 98 at other areas of the bicycle 50, such as locations throughout the frame 52.

Each of FIGS. 1 and 2 depicts an embodiment of a wireless control system that includes a control assembly 120 for controlling components of the bicycle 50. The control assembly 120 may be a plurality of control assemblies. For example, a pair of control assemblies 120 may be used. Other embodiments of the control assembly 120 may be provided (e.g., in a triathlon or time trial application, where a first pair of control assemblies may be used on extensions (not shown) of the handlebars 68 and a second pair of control assemblies may be used adjacent the brake levers 70). Additionally, the embodiments shown may be employed on various configurations of the bicycle 50. For example, the control assembly 120 of FIG. 1 may be employed on the handlebars 68. The control assembly 120 may also be mounted elsewhere on the bicycle 50. For example, an embodiment of the control assembly 120 may be mounted to a stem, where the stem is configured to attach the handlebars 68 to the frame 52.

Referring to FIG. 1, for the bicycle 50 embodied as a road bike, the control assembly 120 has a hood portion 122 mounted to a handlebar 68 with an attachment member connected to a first end of the hood portion 122. The attachment member may be a clamp or may be otherwise attachable, for example, through threaded engagement with the handlebar 68. The hood portion 122 includes a second end attached to the brake lever 70. The hood portion 122 is configured to support rider hand placement forward of the handlebar 68 between the first end and the second end of the hood portion 122. The hood portion 122 may have a hood cover 124 configured to facilitate gripping of the hood portion 122 by the rider. The hood cover 124 may be elastomeric and/or removable for service. The brake lever 70 may be pivotable about a lever axis. For example, a lever pivot may pivotably connect the brake lever 70 to the hood portion 122. The control assembly 120 is shown to further include a switch device 126. The switch device 126 may be a button, lever, or other implement controllable by a rider. The switch device 70 may be a plurality of controls. For example, two of the switch devices 126 may be used on one of the control assemblies 120.

The switch device 126 is, for example, pivotable about the lever axis and rotatably fixed with the brake lever 70 about the lever axis or another axis. The switch device 126 may be configured to be a component of the brake lever 70 or may alternatively be distinct or disconnected from the brake lever 70. For example, the switch device 126 may be pivotable about the lever axis independently from the brake lever 70. The switch device 126 may be movable into a plurality of positions. For example, the switch device 126 may have a rest position, a first actuation position, and a second actuation position. The rest position may be referred to as a first position, the first actuation position may be referred to as a second position, and the second actuation position may be referred to as a third position. Each of the first position, the second position, and the third position of the switch device 126 may correspond to an axial movement of the switch device 126 of different distances along the lever axis or alternatively a rotational movement through an arc about a point defined on the lever axis. For example, a first distance may be defined between the first position and the second position, and a second distance may be defined between the second position and the third position. A path may describe the movement of the switch device 126. For example, the first position, the second position, and the third position may be defined along the path between the second position and the third position. In another example, the first position, the second position, and the third position are defined along the path between the first position and the third position. The brake lever 70 may move with the switch device 126, or the switch device 126 may move relative to the brake lever 70.

Referring to FIG. 2, for the bicycle 50 embodied as a mountain bike, one or more switch devices are located on the handlebars 68 (not shown). The control device 98 may be configured to communicate electronically with at least one of the one or more switch devices. The control device 98 is shown connected to the handlebars 68, but the control device 98 may be connected to other components of the bicycle 50, such as the stem or the frame 52. Alternatively, the control device 98 may be removed from the bicycle 50 (e.g., as a worn or carried device).

Circuitry of the control assembly 120 configured to transmit and/or receive signals may be integrated with the switch device 126, and/or may be remotely located, such as in the control device 98. The control device 98 may be employed to consolidate components of a plurality of the control assemblies 120. For example, the control device 98 may have circuitry that includes transmission and/or reception components that may be included on and/or in the control assembly 120 in other embodiments. The control device 98 may also include a control user interface. The control user interface may be a display and may be configured to represent a status of components and/or may include an interface to control or adjust components. For example, the control user interface may be a touch screen. Alternatively or additionally, the control device may include one or more user device buttons to control or adjust components. In one embodiment, the bicycle 50 includes a plurality of control user interfaces (e.g., at the control device 98 and at the switch device 126). In one embodiment, the bicycle 50 includes a plurality of control devices 98 located at different locations on the bicycle 50. For example, a first control device of the plurality of control devices 98 includes the circuitry of the control assembly 120 and is attached to the frame 52 at a distance from the handlebars 68 of the bicycle 50, and a second control device of the plurality of control devices 98 includes the control user interface and is attached to the handlebars 68, so that the user may interact with the one or more device buttons to control or adjust the components. The first control device and the second control device are in communication with each other (e.g., wirelessly or via wired connection).

In one embodiment, the control assembly 120 may be attached to the handlebar 68 independently of the brake lever 70. Each embodiment of the control assembly 120 is shown to have a single embodiment of the switch device 126. However, another embodiment of the wireless control system may include more than one of the switch devices 126 on one or more of the control assemblies 120. For example, one of the control assemblies 120 may include two of the switch devices 126 arranged in opposition as on a rocker switch, and the other of the control assembly 120 may include a single embodiment of the switch device 126.

The control assembly 120 may include wireless communication components to control other components of the bicycle 50. For example, the control assembly 120 may include a control communication device configured to transmit operation signals responsive to actuation of the switch device 126. The control communication device may be further configured to send signals responsive to actuation of the switch device 126. The control communication device may be configured to send first signals responsive to the first actuation position and second signals responsive to the second actuation position. In one example, actuation of the switch device 126 to the first actuation position may send anticipation signals from the control communication device, and actuation of the switch device 126 to the second actuation position may send operation signals from the control communication device.

The control communication device may also be configured to respond to various signals. For example, one or more control processors (e.g., of the control device 98 and/or of one or more switch devices 126, respectively) may be configured to generate signals in response to actuation of the switch device 126. In an embodiment, the control processor generates a signal configured to change a mode of the control communication device. The control processor may generate an anticipation signal responsive to the first actuation position. The anticipation signal may be configured to change the control communication device to a ready mode. The anticipation signal may be configured to wake up, turn on, or transition the control communication device to a higher power use state. The control processor may also generate a control signal configured to trigger the control communication device to transmit a signal. The control processor may enter a transmit mode upon trigger to transmit a signal. The control communication device may be responsive to transmit the operation signal to control a component of the bicycle 50.

Other components of the bicycle 50 may be configured to respond to various signal types. For example, components may be configured to respond differently to first signals and second signals transmitted by the control communication device. In an embodiment, a component such as the rear derailleur 80 and/or the front gear changer 85 is configured to perform a first action responsive to transmission of the first signal and to perform a second action responsive to transmission of the second signal. In another embodiment, the control communication device is configured to enter the ready mode responsive to the first signal and transmit an operation signal responsive to the second signal.

One signal may trigger various operations of one or more component of the bicycle 50. For example, the control processor may generate the first signal responsive to the first actuation position, where the first signal is configured to change the mode of the control communication device to the ready mode and to trigger the control communication device to transmit the anticipation signal, as in the transmit mode. The anticipation signal may then trigger a component such as the front gear changer 85 or the rear derailleur 80 to listen for an extended period of time. The control processor may then generate the second signal responsive to the second actuation position to trigger the control communication device to transmit an operation signal configured to trigger operation of the component. For example, the operation signal may be configured to control an upshift or a downshift of the rear derailleur 80 and/or the front gear changer 85.

Figure 3:
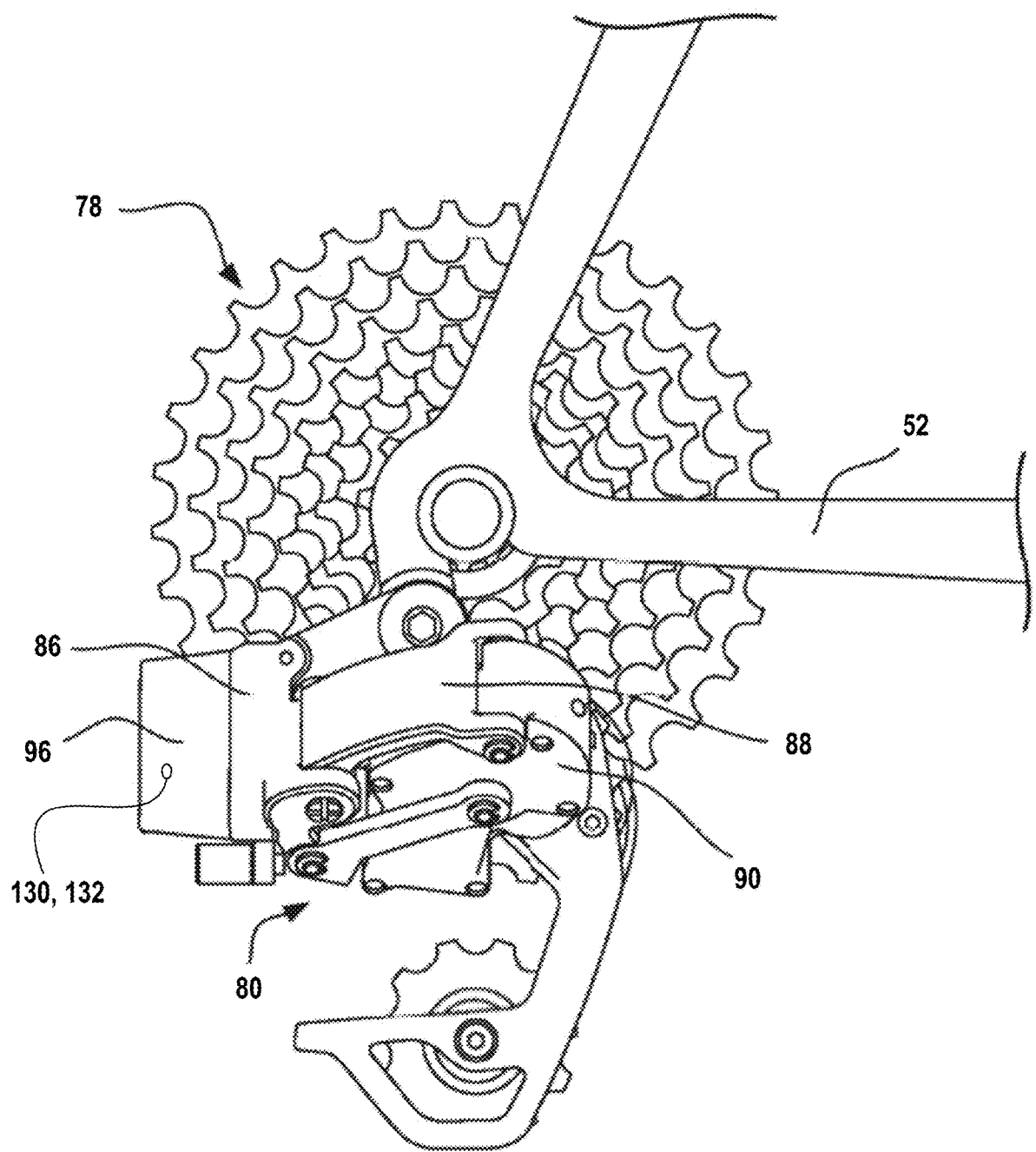
FIG. 3 is a side view of one example of a rear derailleur attached to a bicycle.

Referring to FIG. 3, various embodiments of the device may include the rear derailleur 80 shown to control movement of the chain C between rear sprockets G1-GN of the rear sprocket assembly 78. The rear derailleur 80 depicted in FIG. 3 includes the battery 96. The battery 96 may be rechargeable. The battery 96 is shown attached to the base member 86 of the rear derailleur 80, but may be located on another part or parts of the rear derailleur 80 or on the frame 52. The base member 86 attaches to the frame 52 and is connected to the movable member 90 of the rear derailleur 80 by the linkage 88 of the rear derailleur 80. The movable member 90 is configured to move relative to the base member 86 responsive to force as may be supplied by a rear motor.

A motor of the motor module 94 may be controlled by a rear processor to execute shifts up or down the rear sprocket assembly 78. The rear processor may be responsive to signals generated by the control assembly 120. For example, the control communication device of the control assembly 120 may wirelessly communicate with a rear communication device associated with the rear processor. The rear communication device may be a radio or any other device configured to communicate with the control communication device. In an embodiment, communication between the rear communication device and the control communication device may be wireless.

The rear derailleur 80 may include one or more sensors configured to identify (e.g., measure) parameters of the rear derailleur 80. For example, the rear derailleur 80 may include one or more temperature sensors 130 configured to measure one or more temperatures corresponding to, for example, the battery 96 of the rear derailleur 80. The one or more temperature sensors 130 may be located within the battery 96, on the battery 96, and/or within or on another component of the rear derailleur 80. The one or more temperature sensors 130 may include any number of different kids of temperature sensors including, for example, a semiconductor-based sensor, a thermocouple, and/or another type of temperature sensor.

The rear derailleur 80 may include other types of sensors instead of or in addition to the temperature sensors. For example, the rear derailleur 80 may include one or more voltage sensors 132 configured to identify (e.g., measure) a voltage of the battery 96 and/or one or more current sensors configured to identify (e.g., measure) an input current and/or an output current of the battery 96. The one or more voltage sensors 132 and/or the one or more current sensors may be located within and/or outside of the battery 96, respectively. The one or more sensors of the rear derailleur 80 are in communication with the control processor via the rear processor, which may transmit measured temperatures, voltages, and/or currents to the control processor via, for example, the rear communication device and the control communication device.

The bicycle 50 may include additional, fewer, and/or different sensors. For example, a battery of the seat post assembly 106 may include one or more temperature sensors, one or more voltage sensors, and/or one or more current sensors. As another example, one or more batteries of the suspension system may include one or more temperature sensors, one or more voltage sensors, and/or one or more current sensors. Other sensors may be provided.

Figure 4:
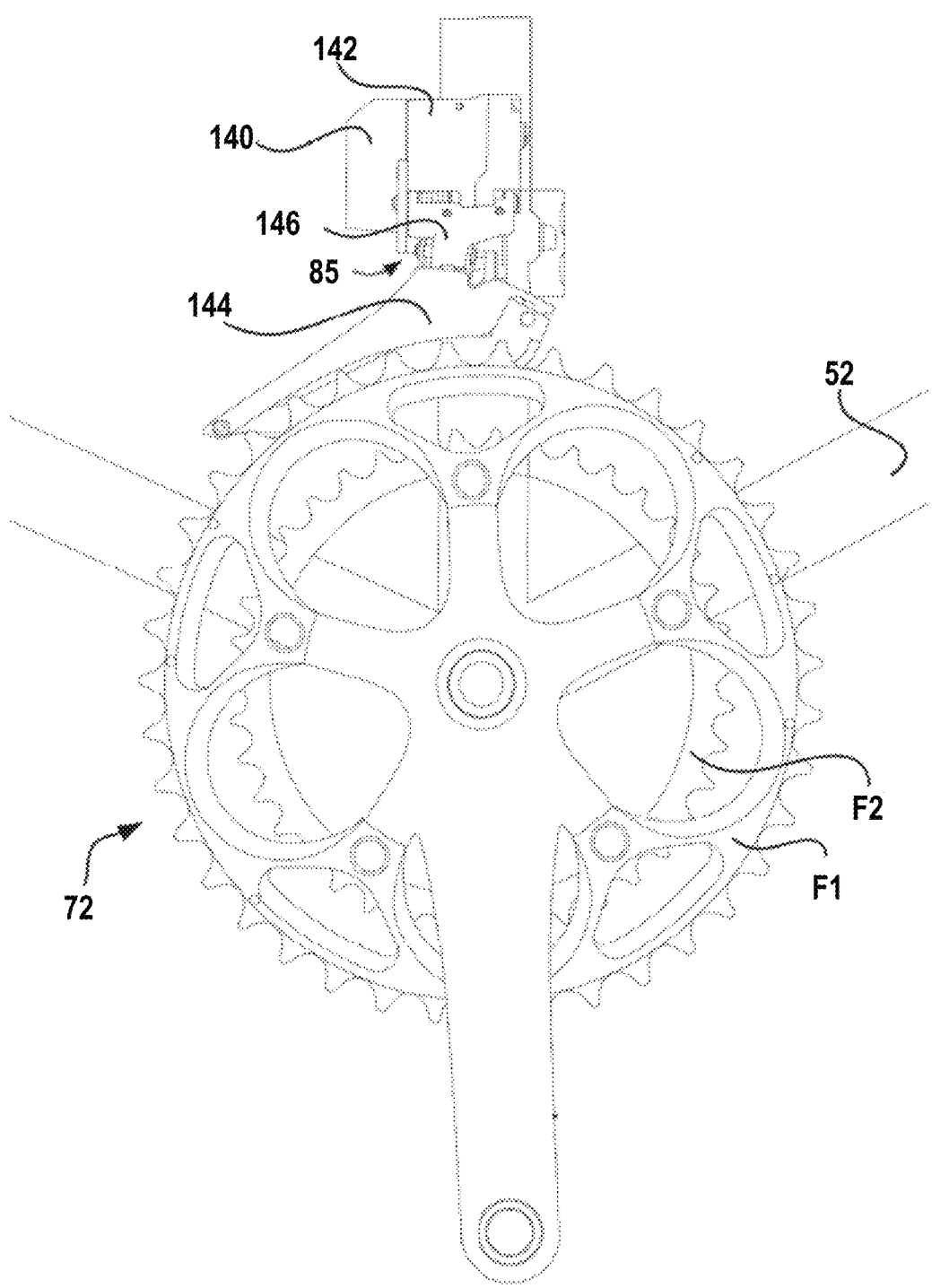
FIG. 4 is a side view of one example of a front gear changer attached to a bicycle.

Referring now to FIGS. 1 and 4, various embodiments of the bicycle 50 may include the front gear changer 85 shown to control movement of the chain C between the front sprockets F1, F2 of the front sprocket assembly 72. The front gear changer 85 includes a front power source 140 (e.g., a battery). Alternatively, the front gear changer 85 may use a common power source. For example, the front gear changer 85 and the rear derailleur 80 may have a wired connection therebetween such that both the rear derailleur 80 and the front gear changer 85 draw power from the battery 96, the front power source 140, or a central power source (not shown).

In one embodiment, the front power source 140 includes one or more temperature sensors configured to identify (e.g., measure) one or more temperatures of the front power source 140, respectively, one or more voltage sensors configured to identify (e.g., measure) one or more voltages of the front power source 140, respectively, and/or one or more current sensors configured to identify (e.g., measure) one or more currents of the front power source 140, respectively.

The front gear changer 85 includes a front base member 142 connected to the frame 52 and a front movable member 144 movably connected to the front base member 142 by a front linkage 146. The front power source 140 may supply power to a front motor. The front motor is configured to apply torque to components of the front gear changer 85 in order to move the front movable member 144 relative to the front base member 142. In such a way, the front gear changer 85 may shift the chain C between the front sprockets F1, F2 of the front sprocket assembly 72.

The front sprocket assembly 72 shown includes the larger diameter front sprocket F1 and the smaller diameter front sprocket F2. A different number of sprockets F may be employed. For example, three sprockets F1, F2, F3 may be employed. Alternatively, a single front sprocket F1 may be employed, in which case the front gear changer 85 may be omitted, as shown in FIG. 2.

A front processor may be included to control the front motor in order to execute shifts up or down the front sprocket assembly 72. The front processor may be responsive to the control assembly 120. For example, the control communication device of the control assembly 120 may wirelessly communicate with a front communication device associated with the front processor. The front communication device may also be configured to wirelessly communicate with the rear communication device associated with the rear processor. For example, the rear communication device may send signals received by the front communication device. In this example, the front communication device may increase listening activity responsive to receiving signals from the rear communication device. The front communication device may be a radio or any other device configured to communicate with the control communication device of the control assembly 120.

Referring to FIG. 1 and the discussion of the switch device 126 above, the switch device 126 may include a control compartment configured to house a control unit. The control compartment may be sealed from environmental factors to protect components of the control unit. In an embodiment, the control compartment is constructed substantially from radio frequency transparent materials.

The control unit may include the control communication device and the control processor. The control unit may include a printed circuit board ("PCB") having circuitry for interpreting actions, generating signals, and/or transmitting signals. Alternatively, the control unit may be omitted and components associated therewith may be otherwise connected. For example, flexible connectors such as wires may be used.

The control unit may be in a PCB configuration. The PCB embodiment of the control unit has a substrate to which components of the control unit are applied and/or attached. The substrate may form a structure and/or shape of the control unit. The substrate may be any substance operable to form an underlying attachment of the components of the control unit, such as a dielectric composite material. For example, composites such as phenolic cotton paper (e.g. FR-2), cotton paper and epoxy (e.g. FR-3), glass-reinforced epoxy (e.g. FR-4, FR-5, FR-6), and/or other materials as well as combinations thereof, may be used. The substrate may be rigid or flexible.

Connection of circuitry to the control unit may be accomplished using various techniques. In an embodiment, connection is accomplished through application of a layer of an electrically conductive medium, such as solder, between electrical contact connection surfaces of the control unit. Such a connection may provide an electrically communicative contact between electronic components connected to the control unit, such as the control communication device and the control processor of the switch device 126. In one embodiment, at least some components of the switch device 126 (e.g., components of the control unit of the switch device 126) are included within the control device 98, and the switch device 126 and the control device communicate via one or more wired and/or wireless connections.

The control unit includes the control processor and a control memory. The control processor may include a general processor, a digital signal processor, an application specific integrated circuit ("ASIC"), a field programmable gate array ("FPGA"), an analog circuit, a digital circuit, combinations thereof, or other now known or later developed processor. The control processor may be a single device or a combination of devices, such as through shared or parallel processing.

The control memory may be a volatile memory or a non-volatile memory. The control memory may include one or more of a read only memory ("ROM"), a random access memory ("RAM"), a flash memory, an electronic erasable program read only memory ("EEPROM"), or another type of memory. The control memory may be removable from the control unit, such as in a secure digital ("SD") memory card. In a particular non-limiting, exemplary embodiment, a computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device. Accordingly, the disclosure is considered to include any one or more of a computer-readable medium and other equivalents and successor media, in which data or instructions may be stored.

The control memory is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding or carrying a set of instructions for execution by a processor or that cause a computer system to perform any one or more of the methods or operations disclosed herein.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

The control unit is operable to interpret a signal indicative of a shift command generated in response to operation of the switch device 126. In accordance with various embodiments of the present disclosure, methods described herein may be implemented with software programs executable by a computer system, such as the control device 98, the control unit of the switch device 126, the rear derailleur 80, the front gear changer 85, and/or other components on the bicycle 50 and/or worn by the user. Further, in an exemplary, non-limited embodiment, implementations may include distributed processing, component/object distributed processing, and parallel processing. Alternatively, virtual computer system processing can be constructed to implement one or more of the methods or functionality as described herein.

A computer program (also known as a program, software, software application, script, or code) may be written in any form of programming language, including compiled or interpreted languages, and the computer program may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and the apparatus may also be implemented as, special purpose logic circuitry (e.g., an FPGA or an ASIC).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware, as well as other electronic components. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data (e.g., magnetic, magneto optical disks, or optical disks). However, a computer need not have such devices. Moreover, a computer may be embedded in another device such as, for example, a mobile telephone, a personal digital assistant ("PDA"), a mobile audio player, a Global Positioning System ("GPS") receiver, a control unit, a rear derailleur, or a front gear changer, to name just a few. Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD-ROM and DVD-ROM disks. The processor and the memory may be supplemented by, or incorporated in, special purpose logic circuitry.

The control communication device provides for data and/or signal communication from the control unit to another component of the bicycle, or an external device such as a mobile phone or other computing device. The control communication device communicates the data using any operable connection. An operable connection may be one in which signals, physical communications, and/or logical communications may be sent and/or received. An operable connection may include a physical interface, an electrical interface, and/or a data interface. The control communication device may be configured to communicate wirelessly, and as such include one or more antennae. The control communication device provides for wireless communications in any now known or later developed format.

A control antenna may also be provided. The control antenna may be a plurality of control antennae. The control unit includes an antenna included with the circuitry of the PCB; however, additional antennae may also be included in the circuitry. The control antenna may be integrated with another component of the bicycle 50 or may be an independent component. For example, the control antenna may be integrated as part of the control communication device and/or as part of the brake lever 70.

Figure 5:
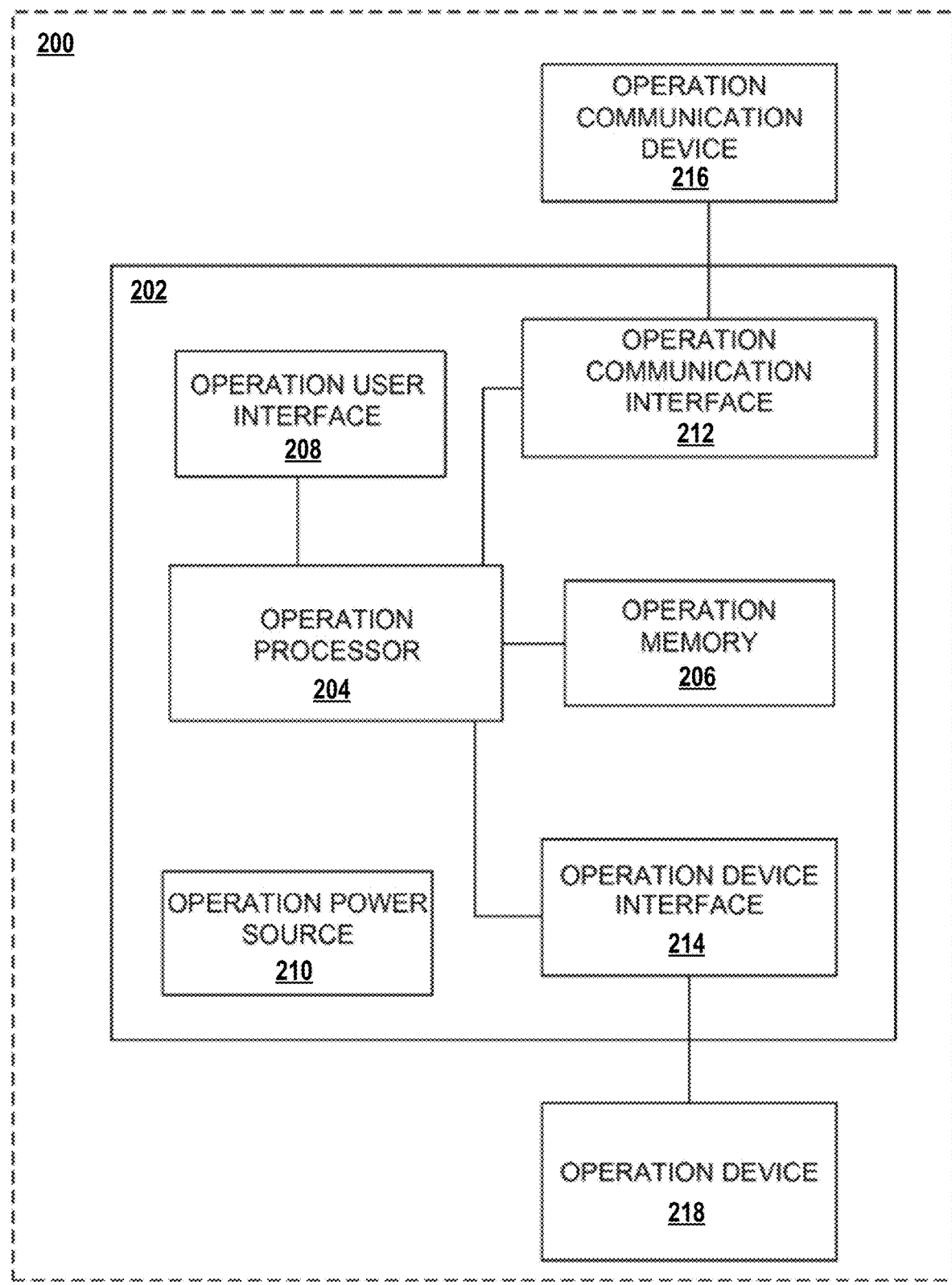
FIG. 5 is a block diagram of an embodiment of a gear changer.

FIG. 5 is a block diagram of an operation component 200. The operation component 200 may be one or more of the previously described components such as, for example, the rear derailleur 80 and the front gear changer 85. The operation component 200 may also be another component, such as an internal gearbox component, a suspension or an adjustable suspension component, or an adjustable seating component. A plurality of operation components 200 may be provided.

The operation component 200 is provided with an operation unit 202, which may be a circuit board or alternative configuration, as described above. The operation unit 202 includes an operation processor 204, an operation memory 206, an operation user interface 208, an operation power source 210, an operation communication interface 212, and an operation device interface 214. In an embodiment, the operation communication interface 212 is in communication with an operation communication device 216 and the operation device interface 214 is in communication with an operation device 218. Additional, different, or fewer components may be provided. For example, the operation user interface 208 may be omitted.

The structure, connections, and functions of the operation processor 204 may be representative of those of the rear processor, the front processor, or another component. The operation processor 204 may include a general processor, digital signal processor, an ASIC, FPGA, analog circuit, digital circuit, combinations thereof, or other now known or later developed processor. The operation processor 204 may be a single device or combinations of devices, such as through shared or parallel processing.

The operation memory 206 may be a volatile memory or a non-volatile memory. The operation memory 206 may include one or more of a ROM, a RAM, a flash memory, an EEPROM, or other type of memory. The operation memory 206 may be removable from the operation component 200, such as an SD memory card. In a particular non-limiting, exemplary embodiment, a computer-readable medium can include a solid-state memory such as a memory card or another package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device. Accordingly, the disclosure is considered to include any one or more of a computer-readable medium and other equivalents and successor media, in which data or instructions may be stored.

The operation memory 206 is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding or carrying a set of instructions for execution by a processor or that cause a computer system to perform any one or more of the methods or operations disclosed herein.

The operation power source 210 is a portable power source, which may be stored internal to the operation component 200 or stored external to the operation component 200 and communicated to the operation component through a power conductive cable. The operation power source 210 may involve the generation of electric power, for example using a mechanical power generator, a fuel cell device, photo-voltaic cells, piezoelectric, or other power-generating devices. The operation power source 210 may include a battery such as a device consisting of two or more electrochemical cells that convert stored chemical energy into electrical energy. The operation power source 210 may include a combination of multiple batteries or other power providing devices. Specially fitted or configured battery types, or standard battery types may be used.

The operation device interface 214 provides for operation of a component of the bicycle 50. For example, the operation device interface 214 may transmit power from the operation power source 210 to generate movement in the operation device 218. In various embodiments, the operation device interface 214 sends power to control movement of at least one of the rear motor and the front motor. The operation device interface 214 includes wired conductive signals and/or data communication circuitry operable to control the operation device 218.

The operation user interface 208 may be one or more buttons, keypad, keyboard, mouse, stylus pen, trackball, rocker switch, touch pad, voice recognition circuit, or other device or component for communicating data between a user and the operation component 200. The operation user interface 208 may be a touch screen, which may be capacitive or resistive. The operation user interface 208 may include an LCD panel, LED, LED screen, TFT screen, or another type of display. The operation user interface 208 may also include audio capabilities or speakers.

The operation communication interface 212 is configured to receive, with the operation communication device 216, data such as anticipation signals, operation signals, and/or other signals from bicycle components (e.g., the switch device 126). The operation communication interface 212 may also be configured to send data such as status signals (e.g., temperature sensor signals) for reception with the switch device 126. The operation communication interface 212 communicates the data using any operable connection. An operable connection may be one in which signals, physical communications, and/or logical communications may be sent and/or received. An operable connection may include a physical interface, an electrical interface, and/or a data interface. The operation communication interface 212 provides for wireless communications through the operation communication device 216 in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

Figure 6:
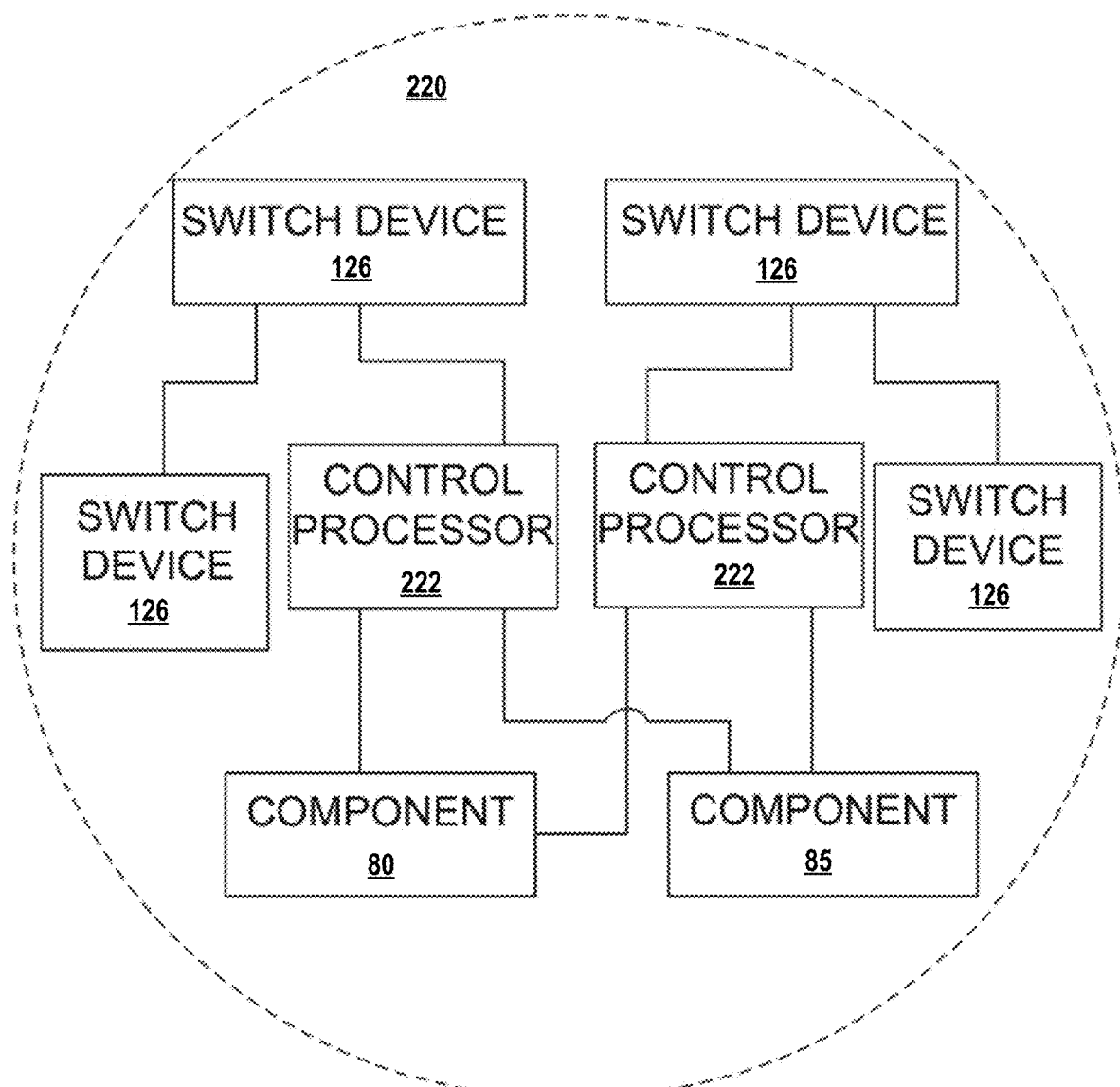
FIG. 6 is a block diagram of an embodiment of an electromechanical control system.

FIG. 6 is a block diagram of an embodiment of an electromechanical control system 220 for a bicycle 50. The electromechanical control system 220 may include one or more series configurations of the switch devices 126. A plurality of the switch devices 126 may connect to a single control processor in parallel or in series.

A control processor 222 communicates with at least one component. For example, the control processor 222 may communicate with the rear derailleur 80 and/or the front gear changer 85. Communication between the control processor 222 and components may be wired or wireless. A plurality of the control processors 222 may be associated with a plurality of components. For example, one or more components may be configured to listen for signals sent by a plurality of the control processors 222. In an embodiment, two of the control processors 222 each communicate with both the rear derailleur 80 and the front gear changer 85.

Figure 7:
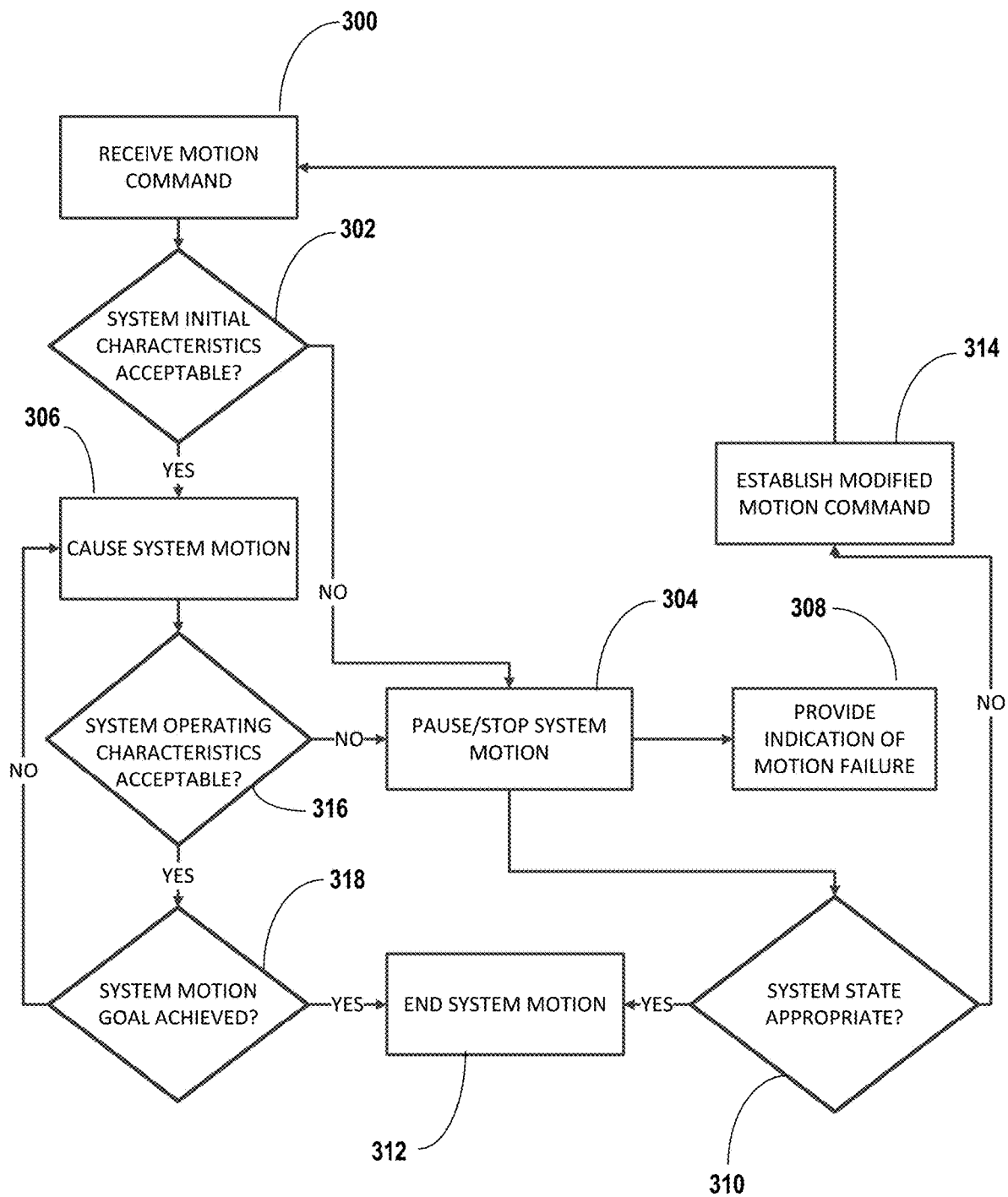
FIG. 7 is a flowchart of an embodiment of a method for controlling motion of a component of a bicycle.

FIG. 7 is a flowchart of an embodiment of a method for electromechanical control of components of the bicycle 50. The flowchart also illustrates a method for transmitting and receiving wireless signals on the bicycle 50. As presented in the following sections, the acts may be performed using any combination of the components indicated in previous figures. For example, the following acts may be performed by the control assembly 120 and the operation component 200, as well as additional or other components. In an embodiment, the acts may be performed by, for example, the control communication device of the switch device 126 the control processor 222, the operation communication device 216, the operation processor 204, the operation device 218, or any combination thereof. Additional, different, or fewer acts may be provided. The acts are performed in the order shown or in other orders. The acts may be repeated.

In act 300, a processor of a bicycle receives a motion command. For example, a control processor of a control device or a switch device of the bicycle (e.g., the control processor 222) identifies user input at a user interface of the bicycle (e.g., the switch device 126). The processor may identify the user input based on signals from one or more sensors within or outside of, for example, the switch device. For example, a user of the bicycle may actuate the switch device, and a sensor within the switch device may determine a position and/or a direction of motion of the switch device after the user actuation (e.g., movement of the switch device 126 from the first position to the second position). The control processor, for example, generates a motion command based on the sensed user actuation of the switch device. The motion command may be for any number of motions for any number of bicycle components (e.g., component motions) including, for example, upshift or downshift of a rear gear shifter (e.g., the rear derailleur 80), upshift or downshift of a front gear shifter (e.g., the front gear shifter 85), raise or lower a seat relative to the frame of the bicycle (e.g., the seat post assembly 106), and/or change characteristics of a suspension system of the bicycle (e.g., the front suspension 102 and/or the rear suspension 104).

In one embodiment, the motion command is automatically generated by the processor. For example, the processor may automatically generate the motion command by another control algorithm executed by the processor or another processor within the bicycle. For example, the processor may automatically generate the motion command in response to output from a cruise control algorithm, a compensating shift algorithm, or another algorithm executed by the processor or the other processor of the bicycle.

In one embodiment, the control processor, for example, transmits the generated motion command to a processor of the bicycle component to be controlled (e.g., the operation processor 204 of the rear derailleur 80, the rear processor). The generated motion command may be transmitted wirelessly, via corresponding antennas, or via a wired connection.

In act 302, the processor determines whether an initial system characteristic is acceptable. The processor may represent a number of processors of the bicycle operating in parallel and may include, for example, the rear processor or another processor on or outside of the bicycle. The processor determining whether initial system characteristics are acceptable may include comparing any number of system parameters to corresponding minimum and/or maximum thresholds (e.g., corresponding ranges). For example, the processor identifies a parameter (e.g., voltage and/or temperature) of a power source used to execute the motion command and compares the identified parameter to a predetermined minimum value and/or maximum value for the identified parameter. If the processor determines the initial system characteristic is not acceptable based on the comparison, the method moves to act 304. If the processor determines the initial system characteristic is acceptable based on the comparison, the method moves to act 306.

In act 304, the requested component motion is paused or stopped. If the processor determines the initial system characteristic is not acceptable (e.g., the identified parameter is less than the predetermined minimum and/or greater than the predetermined maximum), then the requested component motion is not started (e.g., prevented).

In act 308, after the requested component motion is paused or stopped in act 304, a user interface provides an indication of failure of the requested component motion. For example, if the processor determines the initial system characteristic is not acceptable in act 302, the processor generates and transmits a signal to a user interface (e.g., at the control device 98 or the switch device 126), such that the user is made aware of the failure of the requested component motion. For example, the user interface may include a display, LEDS, and/or a radio, and the indication of failure to the user may be a sequence of LEDS, an audio signal, and/or a displayed image or text at the user interface.

In parallel with the indication of the failure of the requested component motion to the user in act 308, the processor determines whether a current system state (e.g., after the requested component motion is paused or stopped) is appropriate in act 310. For example, if the requested component motion is aborted during component motion but prior to the requested component motion being completed, the component may be in a position that prevents proper operation of the bicycle (e.g., the rear derailleur 80 is in between rear sprockets G1-G2).

The processor may identify the current system state using one or more sensors. For example, the one or more sensors may be at the component to be moved. For the embodiment where the requested motion is for the rear gear shifter, for example, one or more sensors (e.g., Hall sensors) may be on and/or within the rear gear shifter and may be configured to determine a position of the rear gear shifter relative to the rear sprockets. If the processor determines the current system state is appropriate, the method moves to act 312 (e.g., the processor determines the initial system characteristic is not acceptable in act 302; a starting position of the rear gear shifter is at a rear sprocket). If the processor determines the current system state is not appropriate, the method moves to act 314.

In act 312, the method ends. Depending on the result of the comparison in act 302, the component to be moved is in a requested position, an intermediate position after the method is aborted, or an initial position after any movement of the component is prevented. The method may be repeated each time a new motion command is received in act 300.

In act 314, when the processor determines the current system state is not appropriate, the processor modifies the motion command received in act 300, such that the bicycle may operate. For example, if the processor determines the rear gear shifter is in between rear sprockets in act 308, the processor may modify the motion command received in act 300 to command the rear gear shifter to move to a nearest rear sprocket. In another example, the processor may modify the motion command received in act 300 to command the rear gear shifter to move to a previous position (e.g., prior to the motion command being received in act 300) or a safe intermediate position (e.g., to a rear sprocket that is between the initial position of the rear gear shifter and the requested position of the rear gear shifter). After the processor modifies the motion command received in act 300, the method moves back to act 300, and the method is repeated.

In act 306, when the processor determines the initial system characteristic is acceptable in act 302, the component is moved based on the motion command received in act 300. For example, the processor may generate and transmit a signal to a motor of or corresponding to the component to be moved based on the motion command received in act 300. As an example, the motion command received in act 300 is a command to move a chain from a first sprocket to a third sprocket with the rear gear shifter (e.g., from sprocket G1 to sprocket G3). The generated signal transmitted to the motor may control current to the motor (e.g., the motor of the rear gear shifter).

The component may be moved iteratively in that the processor checks the system operating characteristics after each iteration. Each iteration may be, for example, a predetermined amount of movement. For example, if the motion command received in act 300 is a command for the rear gear shifter to make multiple sprocket shifts, the processor checks the system operating characteristics after each sprocket shift. In another example, if the motion command received in act 300 is a command to raise the seat to a particular height, the processor may check the system operating characteristics after each predetermined increase in height (e.g., every 2 cm). For a requested motion that requires multiple iterations, the method moves to act 316.

In act 316, the processor again determines whether the system characteristic (e.g., same system characteristics as in act 302) is acceptable. The processor again compares the system parameters to corresponding minimum and/or maximum thresholds. If the processor determines the system characteristic is not acceptable based on the comparison, the method moves to act 304. If the processor determines the system characteristic is still acceptable based on the comparison, the method moves to act 318.

In act 318, the processor determines whether the motion command received in act 300 is complete. For example, the processor determines whether all iterations (e.g., all sprocket shifts) are complete. If the processor determines the motion command received in act 300 is not complete, the method moves back to act 314. If the processor determines the motion command received in act 300 is complete, the method moves to act 312, and the method is complete.

Figure 8A:
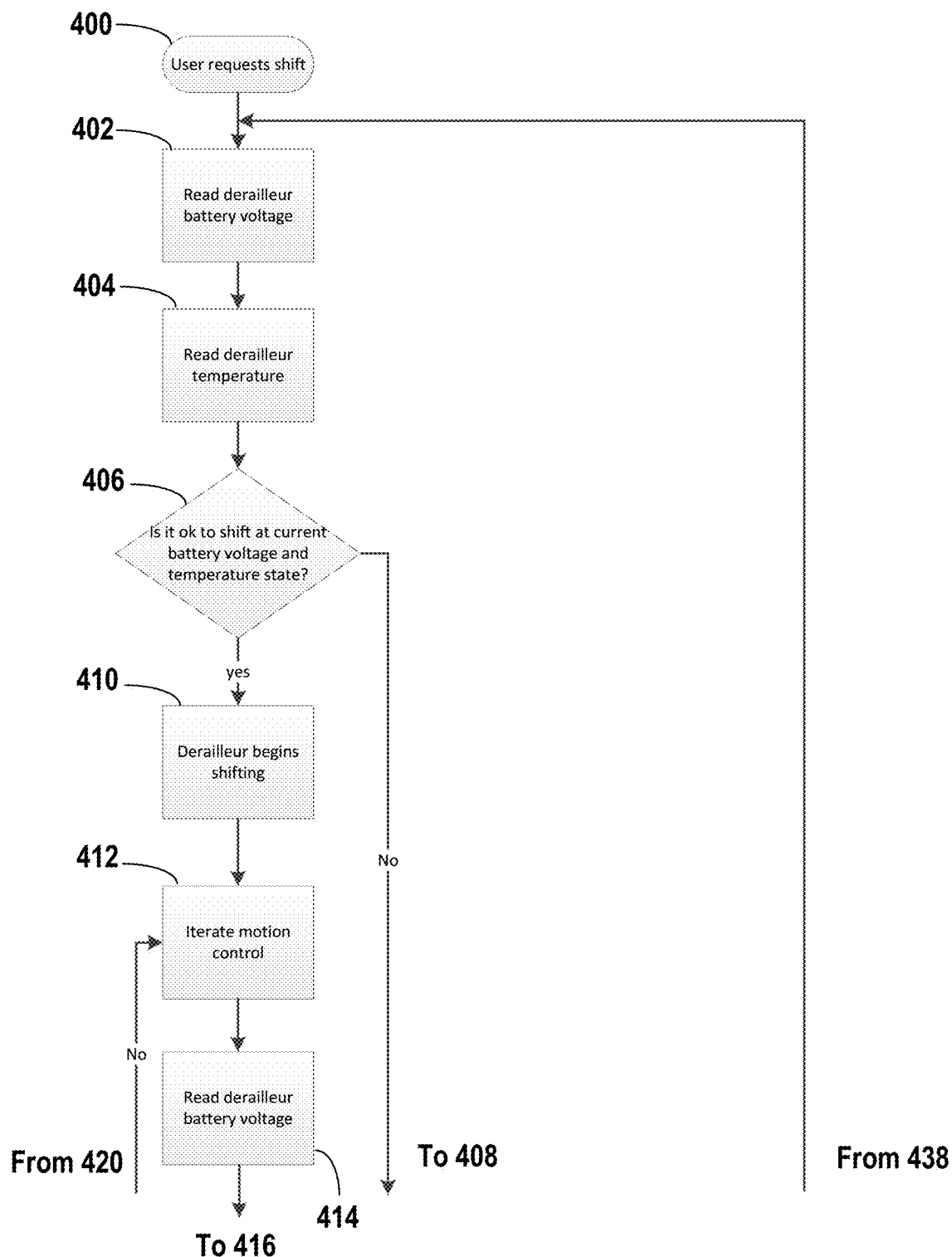
FIGS. 8a-8b together represent a flowchart of an embodiment of a method for controlling motion of a derailleur of a bicycle.
Figure 8B:
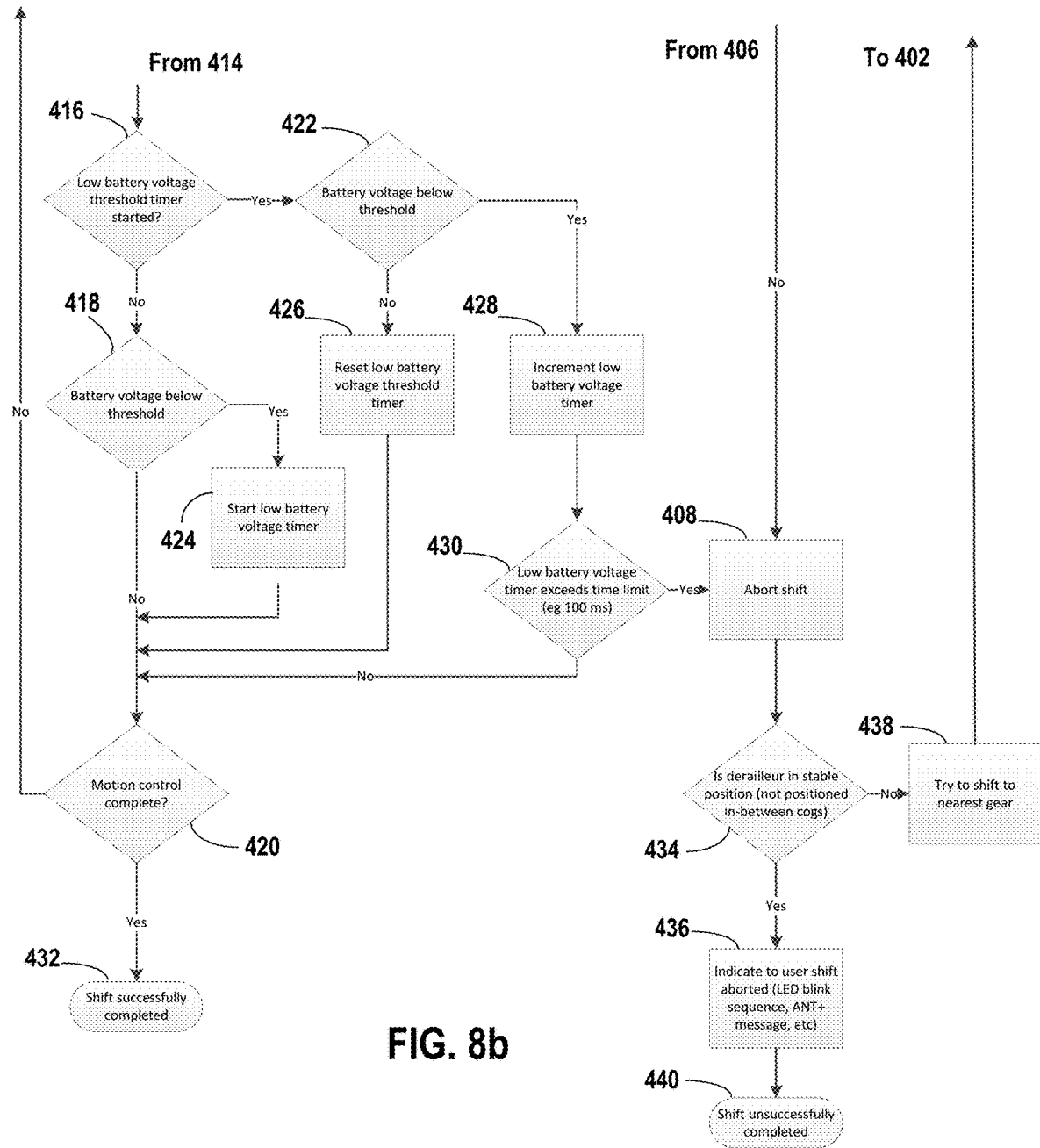

FIGS. 8a-8b together are a flowchart of an embodiment of a method for electromechanical control of the rear derailleur 80 of the bicycle 50. The flowchart also illustrates a method for transmitting and receiving wireless signals on the bicycle 50. As presented in the following sections, the acts may be performed using any combination of the components indicated in previous figures. For example, the following acts may be performed by the control assembly 120 and the operation component 200 of the rear derailleur 80, as well as additional or other components. In one embodiment, the following acts are performed by the control assembly 120 and the operation component 200 of the front gear shifter 85 for control of the front gear shifter 85 of the bicycle 50. In another embodiment, the following acts are performed for the control of another motorized component of the bicycle 50. In an embodiment, the acts may be performed by the control communication device of the switch device 126, for example, the control processor 222, the operation communication device 216, the operation processor 204, the operation device 218, or any combination thereof. Additional, different, or fewer acts may be provided. The acts are performed in the order shown or in other orders. The acts may be repeated.

In act 400, a processor generates and transmits (e.g., via a wired connection or wirelessly) a motion command to a motorized bicycle component to be moved (e.g., the rear derailleur 80). The processor generates and transmits the motion command in response to a user input at a user interface or in response to another control algorithm running on the bicycle (e.g., a cruise control algorithm or a compensating shift algorithm). For example, the user requests, via the user interface, a shift of the rear derailleur.

Before motion of the rear derailleur begins in response to the command transmitted in act 400, in act 402, the processor (e.g., a processor of the rear derailleur) identifies a current voltage of a power source (e.g., current battery voltage) of the rear derailleur, and in act 404, the processor identifies a current temperature of the power source (e.g., current battery temperature). The power source may be any number of different types of power sources including, for example, a battery.

The battery includes one or more voltage sensors and/or one or more temperature sensors. The one or more temperature sensors are positioned on and/or within the battery, such that temperatures measured by the one or more temperature sensors, respectively, accurately represent actual battery temperature. In one embodiment, at least one temperature sensor of the one or more temperature sensors is located outside of the battery, on the rear derailleur to provide an approximation of an actual battery temperature. The processor identifies the current voltage of the power source and the current temperature of the power source from the measurements by the one or more voltage sensors and the one or more temperature sensors, respectively. The processor may identify the current voltage of the power source and the current temperature of the power source in other ways.

In act 406, the processor determines whether the shift requested in act 400 is allowed based on the current battery voltage identified in act 402 and the current battery temperature identified in act 404. For example, the current battery voltage and the current battery temperature are compared to values within a table or calculated with a function representing an acceptable range of temperature and voltage combinations under which the rear derailleur may safely operate. The table and/or the function is stored in a memory in communication with the processor (e.g., a memory of the rear derailleur or another memory) and corresponds to the bicycle, the power source, and/or another configuration of the bicycle (e.g., a current state of the bicycle, such as current gear).

The acceptable operating ranges are predetermined in any number of ways and are stored in the memory as one or more tables and/or functions. For example, the acceptable operating ranges may be determined from operational characterization of the bicycle, properties of the battery, properties of the motor, properties of electronics, or other component or bicycle characteristics. The acceptable operating ranges may be different for different bicycle types. For example, an electronic mountain bicycle rear derailleur may have a different acceptable operating range than an electronic road bicycle rear derailleur. Further, the acceptable operating ranges may differ based on state information about the bicycle such as, for example, current gear. Other parameters may be used to determine acceptable operating ranges such as, for example, a battery "gas gauge" or a "coulomb counter."

If, based on the determination in act 406, safe operating conditions are not met, the shift is not attempted and is aborted in act 408. If, based on the determination in act 406, safe operating conditions are met, the method moves to act 410 and the shift is attempted.

In act 410, the motor starts to move the rear derailleur based on the motion command of act 400. The processor executes a motion control algorithm that controls current to the motor based on the motion command of act 400 (e.g., how many sprockets to shift). In one embodiment, the motion control algorithm includes logic to automatically abort the shift for other reasons such as, for example, stall conditions. The processor continuously runs the motion control algorithm until a stop condition is met (see act 420). The stop condition may be, for example, reaching a target position from the motion command of act 400. As illustrated with act 412, each iteration of the motion control algorithm includes an iteration of at least a portion of the method of FIGS. 8a-8b. Iterations of the motion control algorithm may be, in this example, each sprocket shift.

With each motion iteration, in act 414, the processor identifies current battery voltage (e.g., via the one or more voltage sensors and/or a calculation based on battery current). In act 416, the processor determines whether a low battery voltage threshold timer has been started. If the processor determines that the low battery voltage threshold timer has not been started, the method moves to act 418. If the processor determines that the low battery voltage threshold timer has been started, the method moves to act 422. In both acts 418 and 422, the processor compares the current battery voltage identified in act 414 with a low voltage threshold. The low voltage threshold may correspond to, for example, properties of the battery, properties of battery protection circuitry, and/or other properties of the battery and/or the bicycle. The low voltage threshold is stored in the memory (e.g., in the stored table) or another memory.

If, based on the comparison in act 418, the current battery voltage is below the low voltage threshold, the processor starts the low battery voltage threshold timer in act 424 to track how long the battery voltage remains under the low voltage threshold.

After the low battery voltage threshold timer has been started, the current battery voltage continues to be identified with each iteration, in act 414. If, based on the comparison in act 422 after the low battery voltage threshold timer has been started, the current battery voltage rises above the low voltage threshold, the processor resets the low battery voltage threshold timer in act 426.

For each successive identification of the current battery voltage being below the low voltage threshold (e.g., each successive iteration where this is true), the processor increments the low battery voltage threshold timer in act 428 to keep track of how long the battery voltage has been under the low voltage threshold.

In act 430, the processor compares the low battery voltage threshold timer to a predetermined time threshold (e.g., 100 ms). The predetermined time threshold may be determined by operational characteristics of the bicycle and/or the battery, or from characteristics of the battery and/or battery protection circuitry. The predetermined time threshold may be stored in the memory or another memory.

When, based on the comparison in act 430, the low battery voltage threshold timer exceeds the predetermined time threshold, the method moves to act 408, and the shift is aborted. When the low battery voltage threshold timer is less than the predetermined time threshold, the method moves back to act 420, and another iteration is started unless the requested motion is complete. If the requested motion is complete (e.g., all shifts are completed), the method ends at act 432.

When the requested motion is aborted (e.g., shift aborted at act 408), the processor determines whether the rear derailleur, for example, is in a stable position in act 434. For example, the processor determines whether the rear derailleur is positioned between sprockets of the rear sprocket assembly, such that the user may not ride the bicycle. The processor may determine whether the rear derailleur is in a stable position based on signals from one or more sensors (e.g., Hall sensors identifying a location of the rear derailleur relative to the rear sprocket assembly).

If the processor determines the rear derailleur is in a stable position in act 434, the method moves to act 436. If the processor determines the rear derailleur is not in a stable position in act 434, the method moves to act 438. In act 436, a component of the bicycle (e.g., the control device 98) indicates to the user that the shift has been aborted. For example, the shift aborted indication may be a sequence of LEDs on the bicycle, a radio transmission (e.g., ANT+) to a bicycle computer, audio feedback, or display of a message to the user. After the indication in act 436, the bicycle returns to a non-activating state in act 440.

In act 438, the motion command of act 400 is altered to attempt to restore a position of the rear derailleur prior to the start of the method or to move the derailleur to a safe intermediate position (e.g., to the nearest sprocket). The method is repeated with the altered motion command.

Figure 9:
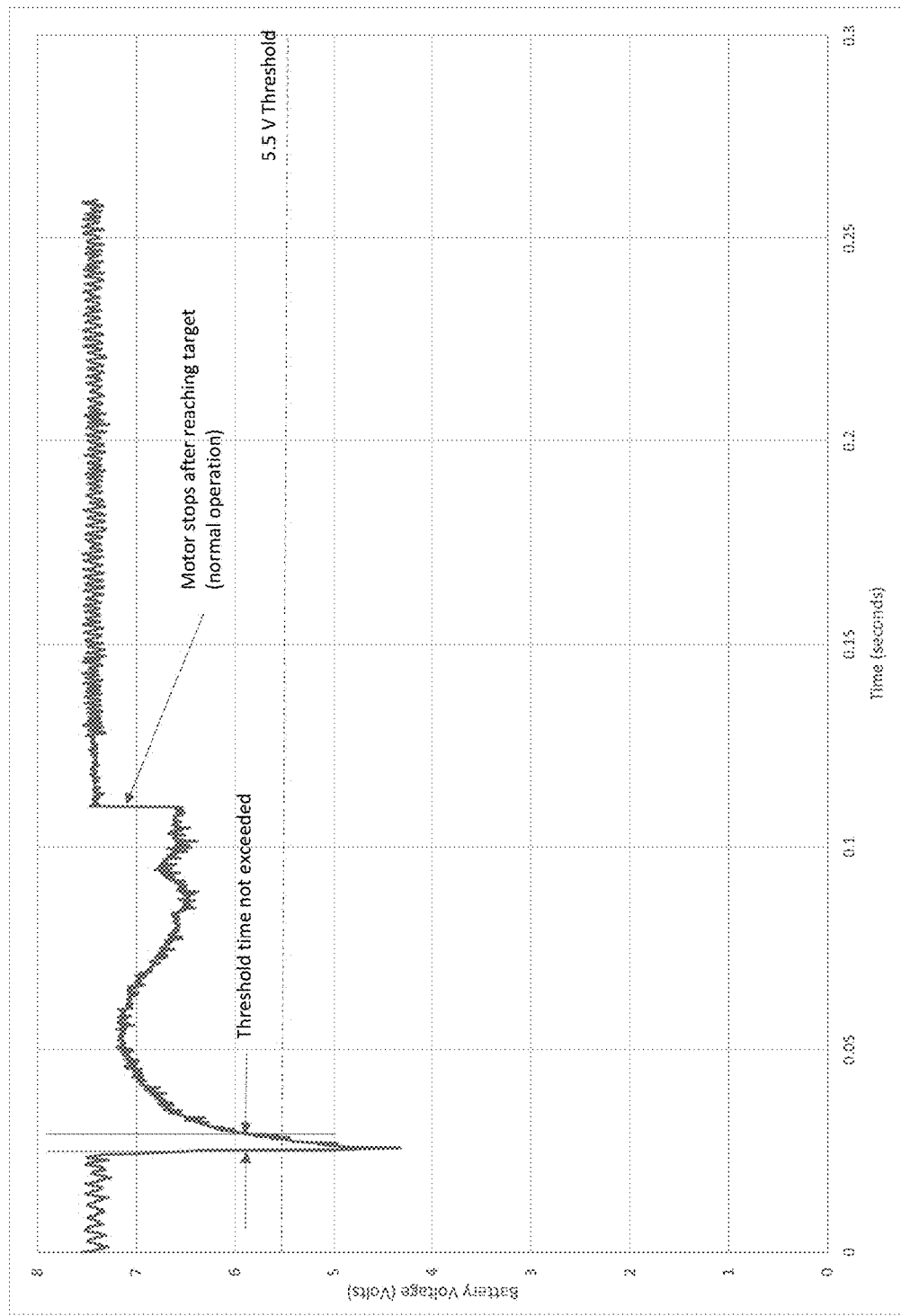
FIG. 9 shows an exemplary graph of battery voltage versus time during the method of FIGS. 8a-8b.

FIG. 9 shows an exemplary graph of battery voltage versus time during the method of FIGS. 8a-8b. FIG. 9 shows an example of the method where the shift is successfully completed, and the method ends at act 432. The time the battery voltage is below the low voltage threshold (e.g., 5.5 V) does not exceed the predetermined time threshold, and the motor stops after the rear derailleur reaches the target position.

Figure 10:
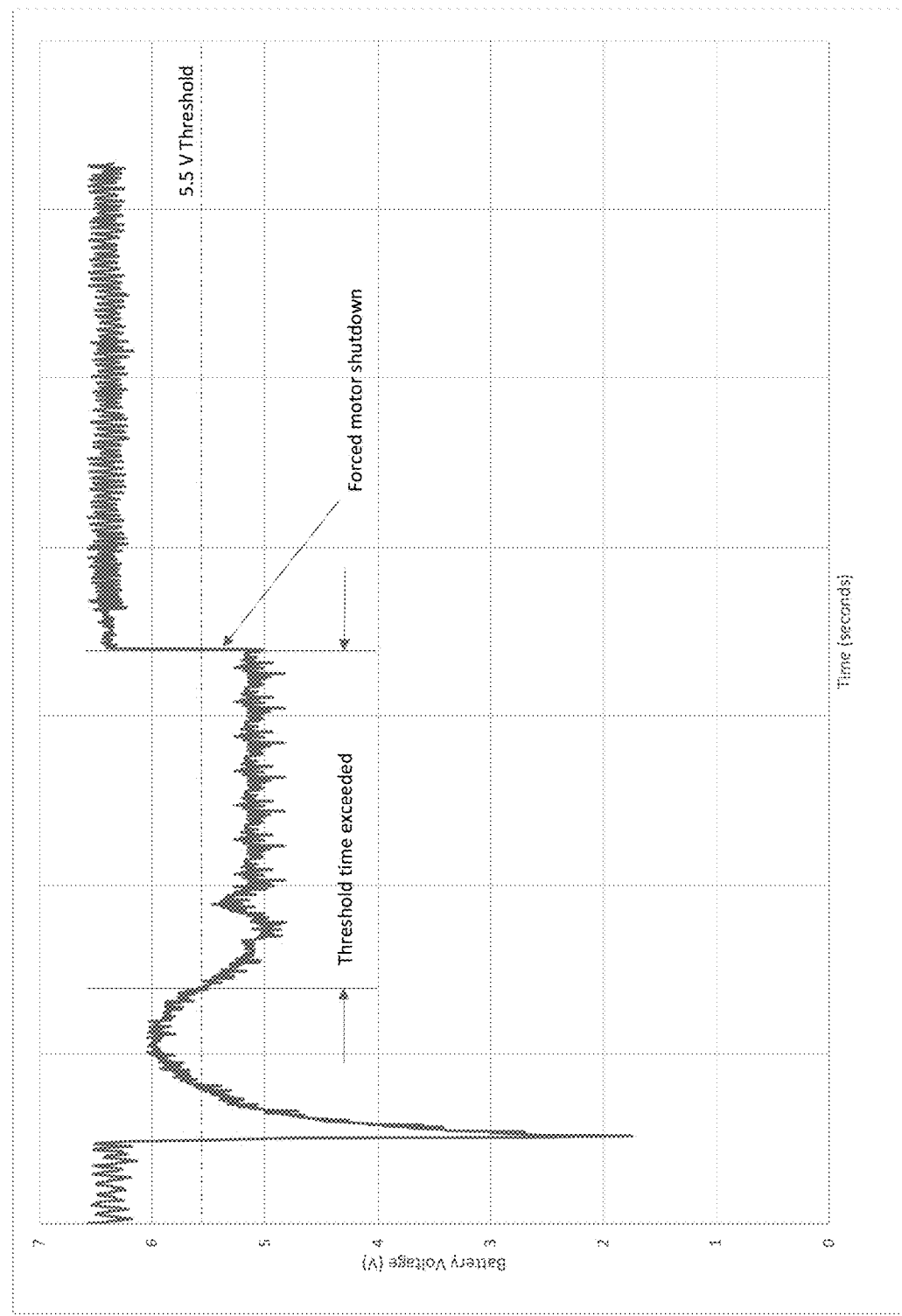
FIG. 10 shows another exemplary graph of battery voltage versus time during the method of FIGS. 8a-8b.

FIG. 10 shows another exemplary graph of battery voltage versus time during the method of FIGS. 8a-8c. FIG. 10 shows an example of the method where the shift is aborted due to the battery voltage being below the low voltage threshold (e.g., 5.5 V) for too long (e.g., >100 ms). In other words, the time the battery voltage is below the low voltage threshold exceeds the predetermined time threshold, and the motor stops when the shift is aborted in act 408. The method ends at act 440 after the shift aborted indication.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A motorized component for a bicycle, the motorized component comprising:
   a power source configured to generate current for a motor, the motor being configured to move a movable part of the motorized component;
   a first sensor configured to measure a first value, the first value representing a first parameter associated with the power source;
   a second sensor configured to measure a second value, the second value representing a second parameter associated with the power source; and
   a processor in communication with the first sensor and the second sensor, the processor being configured to:
      receive a request to move the movable part of the motorized component;
      identify a predetermined threshold, the predetermined threshold being a range of values for a combination of the first parameter and the second parameter;
      compare a combination of the measured first value and the measured second value to the identified predetermined threshold;
      based on the comparison, when the combination of the measured first value and the measured second value achieves the predetermined threshold, control the current from the power source to the motor based on the received request, such that the movable part of the motorized component moves.

2. The motorized component of claim 1, wherein the processor is further configured to, based on the comparison, abort the requested movement when the combination of the measured first value and the measured second value does not achieve the predetermined threshold.

3. The motorized component of claim 2, wherein the processor is further configured to communicate the abortion of the requested movement to a user of the bicycle.

4. The motorized component of claim 1, wherein the processor is further configured to identify operational characterization data for the bicycle, and
   wherein the identification of the predetermined threshold comprises identification of the predetermined threshold based on the identified operational characterization data for the bicycle.

5. The motorized component of claim 4, wherein the operational characterization data for the bicycle data includes data related to a type of the bicycle, a position of the movable part of the motorized component, a property of the power source, a property of the motor, a property of electronics of the motorized component, or any combination thereof.

6. The motorized component of claim 4, further comprising a memory in communication with the processor, the memory being configured to store a plurality of datasets or a plurality of functions, each dataset of the plurality of datasets or each function of the plurality of functions representing a respective predetermined threshold range of values for the combination of the first parameter and the second parameter,
  wherein the identification of the predetermined threshold comprises selection of a dataset of the plurality of datasets or a function of the plurality of functions based on the identified operational characterization data for the bicycle, the selected dataset or function representing the identified predetermined threshold.

7. The motorized component of claim 1, wherein the first parameter is a temperature of the power source, and the second parameter is a voltage of the power source.

8. The motorized component of claim 7, wherein the power source is a battery.

9. The motorized component of claim 1, wherein the motorized component is a derailleur.

10. The motorized component of claim 9, wherein the received request to move the movable part of the derailleur includes a plurality of movements,
  wherein the first sensor is configured to measure the first value before each movement of at least a subset of movements of the plurality of movements, and the second sensor is configured to measure the second value before each movement of at least the subset of movements, and
  wherein before each movement of at least the subset of movements, the processor is further configured to:
    compare a combination of the respective measured first value and the respective measured second value to the identified predetermined threshold or another predetermined threshold, the other predetermined threshold being another range of values; and
    based on the comparison, abort the requested movement when the combination of the respective measured first value and the respective measured second value does not achieve the predetermined threshold or the other predetermined threshold.

11. The motorized component of claim 10, wherein the received request to move the movable part is a request to move the movable part from a first position to a second position, and
  wherein when the requested movement is aborted, the processor is further configured to move the movable part, via the power source and the motor, back to the first position or to a third position between the first position and the second position.

12. The motorized component of claim 10, wherein the subset of movements is the plurality of movements.

13. The motorized component of claim 10, wherein the processor is further configured to:
  identify a predetermined voltage minimum and a predetermined low voltage time limit; and
  before each movement of at least the subset of movements:
    compare the respective measured second value to the identified predetermined voltage minimum;
    based on the comparison, when the respective measured second value is less than the identified predetermined voltage minimum:
      identify whether a timer is running;
      when the timer is identified as not running, start the timer;
      when the timer is identified as running:
        compare a time of the timer to the identified predetermined low voltage time limit; and
        based on the comparison, abort the requested movement when the time of the timer is greater than the identified predetermined low voltage time limit; and
    based on the comparison, when the respective measured second value is greater than the identified predetermined voltage minimum, reset the timer when the timer is running.

14. The motorized component of claim 10, wherein the plurality of movements are a plurality of gear shifts of the derailleur, respectively.

15. A rear derailleur for a bicycle, the rear derailleur comprising:
  a motor configured to move a movable part of the rear derailleur;
  a battery configured to power the motor;
  a first sensor configured to measure a temperature associated with the battery;
  a second sensor configured to measure a voltage of the battery; and
  a processor in communication with the first sensor and the second sensor, the processor being configured to:
    compare a combination of the measured temperature and the measured voltage to a predetermined threshold, the predetermined threshold being a range of values; and
    based on the comparison, when the combination of the measured temperature and the measured voltage achieves the predetermined threshold, move the movable part of the rear derailleur with the motor and the battery.

16. The rear derailleur of claim 15, wherein the processor is further configured to receive a request to move the movable part of the rear derailleur, and
  wherein the movement of the movable part of the rear derailleur is based on the received request.

17. The rear derailleur of claim 16, wherein the processor is further configured to:
  identify operational characterization data for the bicycle; and
  identify the predetermined threshold range of values for the combination of the first parameter and the second parameter based on the identified operational characterization data for the bicycle.

18. The rear derailleur of claim 17, wherein the processor is further configured to, based on the comparison, abort the requested movement when the combination of the measured temperature and the measured voltage does not achieve the predetermined threshold.

19. The rear derailleur of claim 18, wherein the processor is further configured to communicate the abortion of the requested movement to a user of the bicycle.

20. A method for controlling motion of a movable part of a motorized component of a bicycle, the bicycle comprising a power source and a motor, the power source being configured to power the motor, the method comprising:
  measuring, by a first sensor, a first value, the first value representing a first parameter associated with the power source;
  measuring, by a second sensor, a second value, the second value representing a second parameter associated with the power source; and
  receiving, by a processor in communication with the first sensor and the second sensor, a request to move the movable part of the motorized component;

identifying a predetermined threshold, the predetermined threshold being a range of values for a combination of the first parameter and the second parameter;

comparing a combination of the measured first value and the measured second value to the identified predetermined threshold range of values;

moving, by the motor, based on the comparison, the movable part when the combination of the measured first value and the measured second value achieves the predetermined threshold range of values.

* * * * *